(12) United States Patent
Komatsuzaki et al.

(10) Patent No.: US 10,541,760 B2
(45) Date of Patent: Jan. 21, 2020

(54) RADIO COMMUNICATION APPARATUS AND ANTENNA CALIBRATION METHOD

(71) Applicant: FUJITSU LIMITED, Kawasaki-shi, Kanagawa (JP)

(72) Inventors: Akihiko Komatsuzaki, Kawasaki (JP); Shinichiro Kobayashi, Yokohama (JP); Ryo Koizumi, Yokohama (JP); Toshiyuki Takada, Kawasaki (JP); Yumihiko Annaka, Asaka (JP); Hiroshi Yasui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/205,628

(22) Filed: Nov. 30, 2018

(65) Prior Publication Data

US 2019/0199454 A1   Jun. 27, 2019

(30) Foreign Application Priority Data

Dec. 25, 2017 (JP) ................. 2017-247902

(51) Int. Cl.
*H04B 17/12* (2015.01)
*H04W 88/10* (2009.01)
*H04B 1/00* (2006.01)

(52) U.S. Cl.
CPC .......... *H04B 17/12* (2015.01); *H04B 1/0053* (2013.01); *H04W 88/10* (2013.01)

(58) Field of Classification Search
CPC .......... H04B 17/21; H04B 1/28; H04B 17/00; H04B 17/0085; H04B 17/12; H04B 1/0003; H04B 7/0617; H04B 7/084; H04B 7/0682; H04B 1/0053; H04B 1/0007; H04B 17/11; H04W 88/10
See application file for complete search history.

(56) References Cited

U.S. PATENT DOCUMENTS

| | | | |
|---|---|---|---|
| 2003/0176174 A1* | 9/2003 | Seppinen | H04B 17/20 455/226.1 |
| 2006/0009180 A1* | 1/2006 | Xu | H04B 1/0039 455/226.1 |
| 2006/0135211 A1* | 6/2006 | Chae | H01Q 3/26 455/562.1 |

FOREIGN PATENT DOCUMENTS

| | | |
|---|---|---|
| JP | 2003-234610 | 8/2003 |
| JP | 2006-166452 | 6/2006 |

* cited by examiner

*Primary Examiner* — Christopher M Brandt
*Assistant Examiner* — Jing Gao
(74) *Attorney, Agent, or Firm* — Fujitsu Patent Center

(57) ABSTRACT

A radio communication apparatus configured to perform frequency conversion on a first transmission signal modulated at a frequency in a specific frequency band into a second transmission signal having a frequency in a transmission frequency band, in which the apparatus includes: a circuit configured to generate a first calibration signal having a frequency higher than a highest frequency in the specific frequency band, and a second calibration signal having a frequency lower than a lowest frequency of the specific frequency band; a circuit configured to add the first and second calibration signals to the first transmission signal; a circuit configured to estimate a phase at a center frequency in the specific frequency band of the first transmission signal, and output a phase correction coefficient corresponding to the estimated phase; and a circuit configured to correct the phase of the first transmission signal, based on the phase correction coefficient.

7 Claims, 16 Drawing Sheets

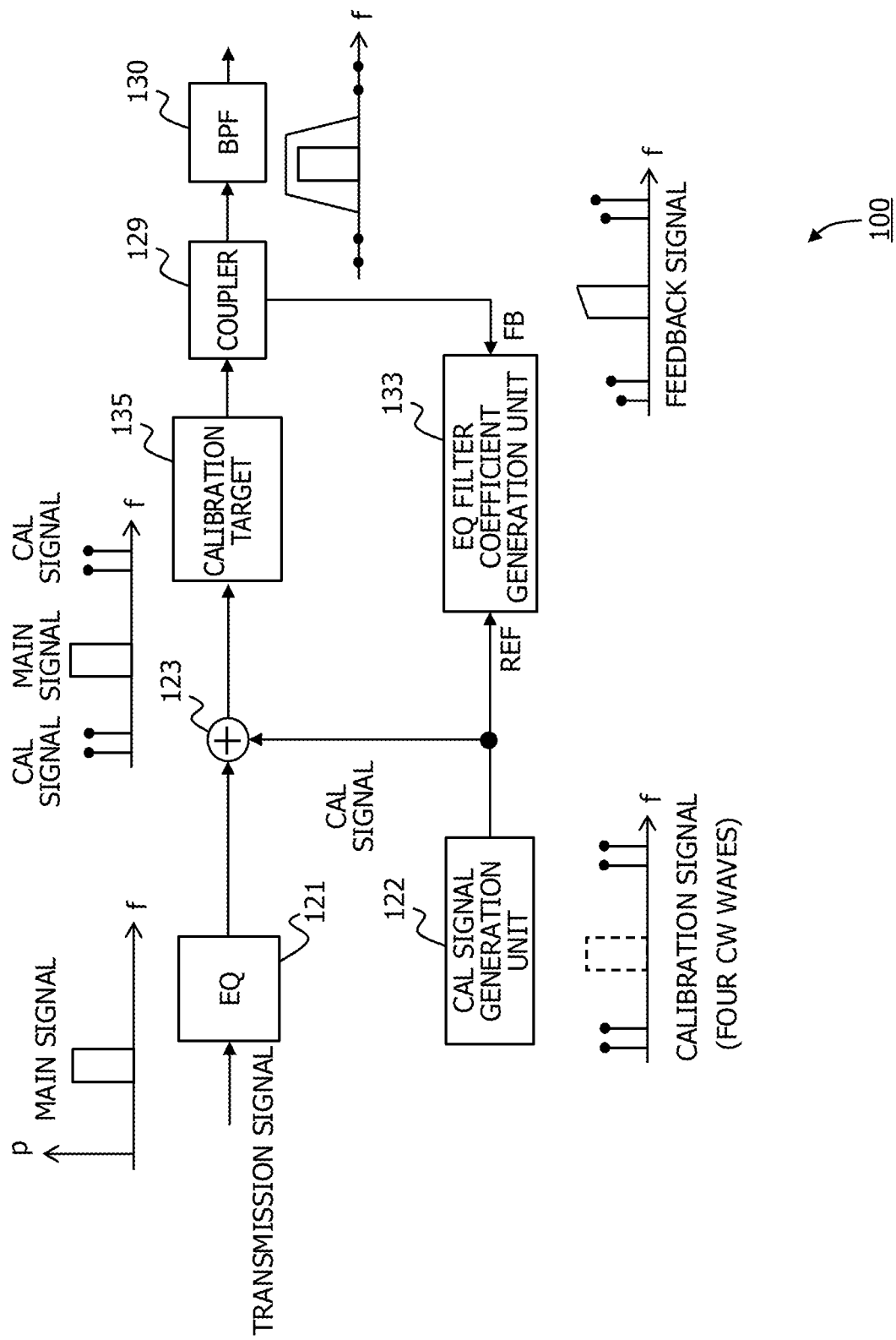

RADIO COMMUNICATION APPARATUS AND ANTENNA CALIBRATION METHOD

CROSS-REFERENCE TO RELATED APPLICATION

This application is based upon and claims the benefit of priority of the prior Japanese Patent Application No. 2017-247902, filed on Dec. 25, 2017, the entire contents of which are incorporated herein by reference.

FIELD

The embodiments discussed herein are related to a radio communication apparatus and an antenna calibration method.

BACKGROUND

Base station apparatuses may adopt beamforming for an adaptive array antenna to perform radio communication with a terminal apparatus.

An adaptive array antenna represents, for example, an array antenna in which a plurality of antenna elements are arranged and phases of signals input to the individual antenna elements are adaptively controlled according to the propagation environment so that the directivity of the antenna may be electrically changed. Furthermore, beamforming represents, for example, a technique for controlling the directivity of an antenna. With the beamforming, a base station apparatus is able to transmit a radio signal to a direction in which a terminal apparatus is present and receive a radio signal transmitted from the direction in which the terminal apparatus is present.

In a base station apparatus, for example, an analog element such as an amplifier may be arranged up to an input end of each antenna element. Phases of signals input to input ends of antenna elements may differ according to the difference in characteristics between analog elements. In such a case, for example, calibration may be performed in the base station apparatus. Calibration represents, for example, a phase correction technique for causing different phases of individual antenna elements to match. By such calibration, for example, phases of transmission signals at input ends of individual antenna elements are made to match, so that the accuracy of beamforming may be increased.

As such a technique, for example, in a scheduler, a calibration signal is generated at a carrier to which no data signal is allocated. A base band processor calculates a calibration vector value, based on the calibration signal and a reception signal based on the calibration signal received through a transmission path, calibrates a beam coefficient using the calibration vector value, and transmits a data signal to the transmission path.

With this technique, in a multicarrier wave communication system using a smart antenna, an improved calibration apparatus and method for control of the phase and size of signals may be provided.

Furthermore, an array antenna apparatus has been available in which for combining of signals from antenna elements, a combining circuit connected to a phase shifter (phase control circuit) extracts a calibration signal outside a reception band through a first filter that is connected in a branching manner to each reception system, and calibration is performed by calculating a phase deviation among the reception systems based on the extracted calibration signal.

With this technique, in an array antenna apparatus, a calibration operation corresponding to a change in characteristics caused by a temperature change or the like may be performed properly and accurately.

Examples of the related art include, for example, Japanese Laid-open Patent Publication Nos. 2006-166452 and 2003-234610.

SUMMARY

According to an aspect of the embodiments, a radio communication apparatus configured to perform frequency conversion of a first transmission signal that has been modulated at a frequency in a specific frequency band to convert the first transmission signal into a second transmission signal having a frequency in a transmission frequency band and transmit the second transmission signal, in which the radio communication apparatus includes: a calibration signal generation circuit configured to generate a first calibration signal outside the specific frequency band, the first calibration signal having a frequency higher than a highest frequency in the specific frequency band, and a second calibration signal outside the specific frequency band, the second calibration signal having a frequency lower than a lowest frequency of the specific frequency band; an adding circuit configured to add the first and second calibration signals to the first transmission signal; a phase correction coefficient generation circuit configured to estimate a phase at a center frequency in the specific frequency band of the first transmission signal, based on the first and second calibration signals and the second transmission signal, and output a phase correction coefficient corresponding to the estimated phase; and a phase correction circuit configured to correct the phase of the first transmission signal, based on the phase correction coefficient.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of the relationship of a main signal, CAL signals, and an FB signal;

DESCRIPTION OF EMBODIMENTS

In all the techniques described above, calibration signals use carriers to which no data signal is allocated, frequencies outside the reception band of the data signal, or frequencies outside the band of the data signal.

As described above, in all of the techniques described above, calibration is performed using a signal whose frequency is different from that of a data signal. Therefore, compared to calibration for a data signal itself, the accuracy of calibration may be low.

In a technique for generating a calibration signal at a carrier to which no data signal is allocated and calculating a calibration vector value, generation of the calibration signal and calculation of the vector are performed by a base band unit. Therefore, for calculation of the vector, a reception signal that has passed through a transmission path may be fed back to the base band unit side. In the case where a high-frequency radio signal is fed back to the base band unit side, processing for the high-frequency radio signal may be performed by the base band unit. Thus, with this technique, the circuit size of the base station apparatus is increased and processing is complicated, compared to the case where feedback processing is not performed.

In an aspect, a radio communication apparatus and an antenna calibration method that are able to increase the accuracy of calibration are provided.

In another aspect, a radio communication apparatus and an antenna calibration method that are able to avoid complication of processing are provided.

Hereinafter, embodiments will be described in detail with reference to drawings. Objects and embodiments herein are merely examples and are not intended to limit the scope of this application. Embodiments may be combined in an appropriate manner without contraction of processing contents. Terms and technical contents described in specifications as standards for communications may be employed appropriately as terms used herein and technical contents described herein.

First Embodiment

<Example of Configuration of Radio Communication System>

Figure 1:
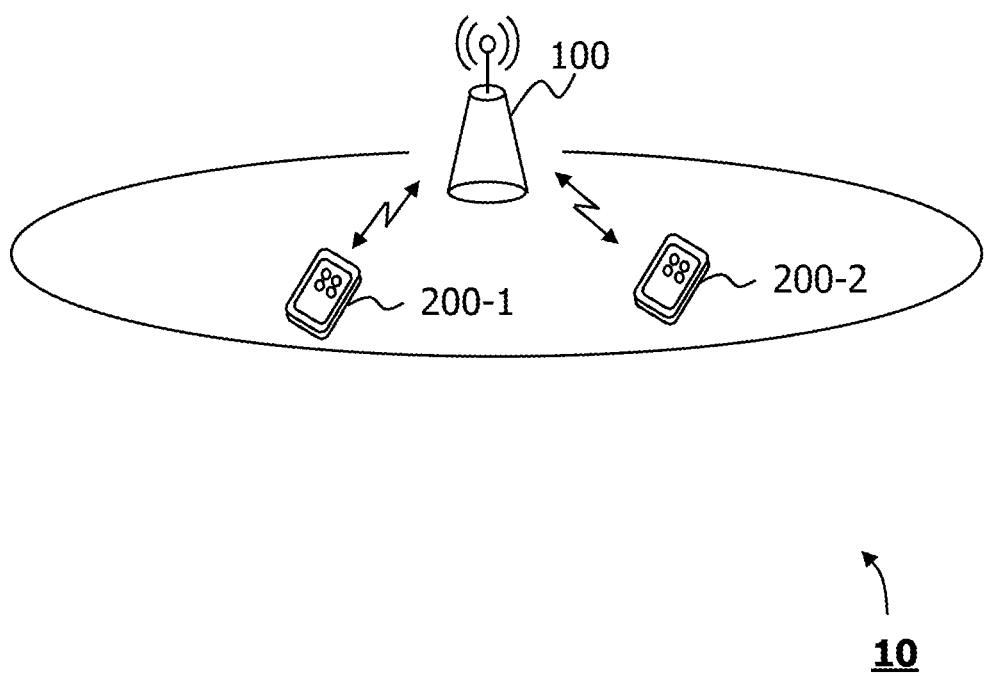
FIG. 1 illustrates an example of a configuration of a radio communication system.

FIG. 1 illustrates an example of a configuration of a radio communication system 10 according to a first embodiment.

The radio communication system 10 includes a base station apparatus (hereinafter, may be referred to as a "base station") 100 and terminal apparatuses (hereinafter, may be referred to as "terminals") 200-1 and 200-2.

The base station 100 is, for example, a radio communication apparatus that performs radio communication with the terminals 200-1 and 200-2. The base station 100 performs radio communication with the terminals 200-1 and 200-2 that are located within a service provision possible range (or a communication possible range or a cell range), so that various services may be provided to the terminals 200-1 and 200-2.

The terminals 200-1 and 200-2 are, for example, radio communication apparatuses such as smartphones, feature phones, tablet terminals, personal computers, or game machines. The terminals 200-1 and 200-2 are capable of radio communication with the base station 100 to receive provision of various services via the base station 100. For example, a call service and a web browsing service are available as services provided.

An example in which the two terminals 200-1 and 200-2 perform radio communication with the base station 100 is illustrated in FIG. 1. However, the number of the terminals 200-1 and 200-2 that perform radio communication with the base station 100 may be one, three, or more.

In the explanation provided below, for example, the terminals 200-1 and 200-2 may be referred to as terminals 200.

<Example of Configuration of Base Station Apparatus>

Figure 2:
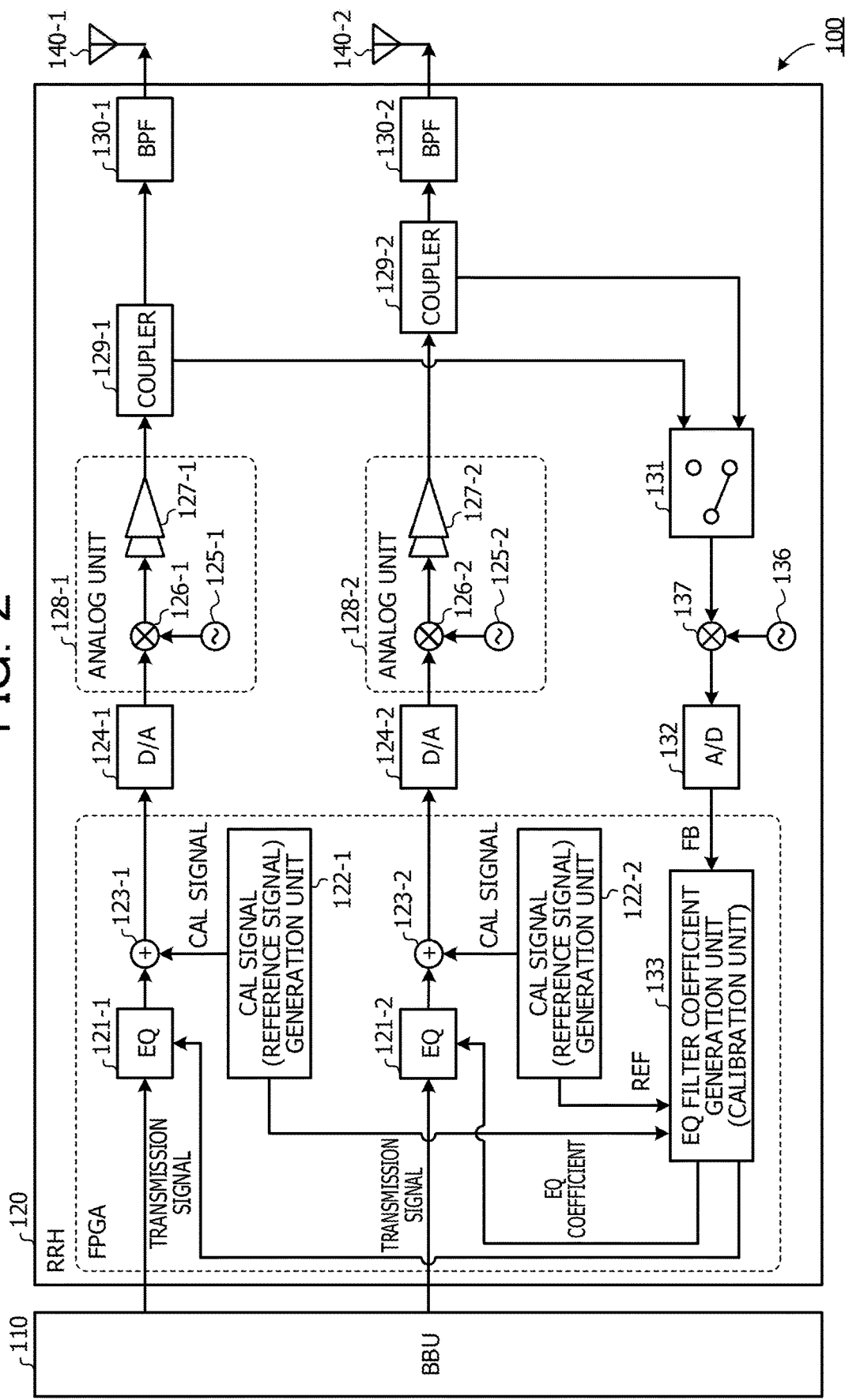
FIG. 2 illustrates an example of a configuration of a base station apparatus.

FIG. 2 illustrates an example of a configuration of the base station 100.

As illustrated in FIG. 2, the base station 100 includes a base band unit (BBU) 110, a remote radio head (RRH) 120, and antennae 140-1 and 140-2.

The BBU 110 and the RRH 120 may be away from each other with a distance of, for example, about several meters to several kilometers. The BBU 110 may be referred to as a radio equipment controller (REC), and the RRH 120 may be referred to as radio equipment (RE).

The BBU 110 receives packet data transmitted from an NW server or the like and extracts data addressed to a terminal 200 from the received packet data. The BBU 110 performs error correction coding, modulation processing, or the like for the extracted data. The BBU 110 generates, for example, a transmission signal (or a base band signal) obtained by modulating the data that has been subjected to error correction coding at a specific frequency within a specific frequency band (for example, a frequency in a base band). The transmission signal contains, for example, an in-phase (I) component and a quadrature (Q) component. The BBU 110 transmits the generated transmission signal to the RRH 120. In the example illustrated in FIG. 2, the BBU 110 transmits two transmission signals.

Hereinafter, a specific frequency band used for modulation processing in the BBU 110 may be referred to as, for example, a base band. For example, the BBU 110 modulates data using a frequency within a base band. Therefore, a modulated transmission signal has the frequency in the base band.

The RRH 120 receives the base band signal transmitted from the BBU 110, and performs frequency conversion processing or the like for the received base band signal to convert the base band signal into a radio signal having a frequency of a radio band (or a transmission frequency band) (up-conversion). The RRH 120 outputs radio signal to the antennae 140-1 and 140-2.

The antennae 140-1 and 140-2 transmit the radio signals output from the RRH 120 to the terminal 200.

As illustrated in FIG. 2, the RRH 120 includes equalizers ((EQs) hereinafter, may be referred to as "EQs") 121-1 and 121-2, calibration signal generation units (or CAL signal generation units, hereinafter, may be referred to as "CAL signal generation units") 122-1 and 122-2, and adding units 123-1 and 123-2. The RRH 120 also includes D/A conversion units 124-1 and 124-2, local oscillators 125-1 and 125-2, mixers 126-1 and 126-2, amplifiers 127-1 and 127-2, couplers 129-1 and 129-2, and band pass filters (BPFs) 130-1 and 130-2. The RRH 120 further includes a switch 131, an analog-to-digital (A/D) conversion unit 132, an EQ filter coefficient generation unit 133, a local oscillator 136, and a mixer 137.

All the local oscillators 125-1 and 125-2, the mixers 126-1 and 126-2, and the amplifiers 127-1 and 127-2 are, for example, analog elements, and these parts may be referred to as analog units 128-1 and 128-2.

In FIG. 2, an example in which the RRH 120 performs processing for two transmission signals and transmits the transmission signals (radio signals) through the two antennae 140-1 and 140-2 is illustrated. For example, the RRH 120 may include three or more antennae and perform processing for three or more transmission signals. In this case, the RRH 120 includes an EQ, a CAL signal generation unit, an adding unit, a D/A conversion unit, an analog nit, a coupler, and a BPF for each of the antennae.

In FIG. 2, a processing block system for a transmission signal on an upper side (from the EQ 121-1 to BPF 130-1) and a processing block system for a transmission signal on a lower side (from the EQ 121-2 to the BPF 130-2) have the same configuration. The processing block on the upper side will be explained below.

For example, the EQ 121-1 corrects the phase of a transmission signal output from the BBU 110, based on an EQ coefficient output from the EQ filter coefficient generation unit 133. The EQ 121-1 is, for example, a phase correction unit (or a phase correction circuit). The EQ 121-1 outputs the corrected transmission signal to the adding unit 123-1.

The CAL signal generation unit 122-1 generates two calibration signals (hereinafter, may be referred to as "CAL signals") having frequencies outside the base band for the transmission signal (or the main signal) modulated at a frequency in the base band by the BBU 110. For example, one of the CAL signals has a frequency higher than the highest frequency in the base band, and the other CAL signal has a frequency lower than the lowest frequency in the base band. The CAL signals are used as, for example, phase correcting signals. The details of the CAL signals will be described later. The CAL signal generation unit 122-1 outputs the generated two CAL signals to the adding unit 123-1.

The adding unit 123-1 adds the transmission signal output from the EQ 121-1 to the two CAL signals output from the CAL signal generation unit 122-1. The adding unit 123-1 outputs the resultant transmission signal to the D/A conversion unit 124-1.

The D/A conversion unit 124-1 converts the resultant transmission signal, which is a digital signal, into an analog signal. The D/A conversion unit 124-1 outputs the resultant analog transmission signal to the mixer 126-1.

The local oscillator 125-1 generates, for example, an oscillation signal of a specific frequency and outputs the generated oscillation signal to the mixer 126-1.

The mixer 126-1 is, for example, a mixing device. The mixer 126-1 multiplies the analog transmission signal by the oscillation signal output from the local oscillator 125-1 to convert the transmission signal in an intermediate frequency (IF) band that may be processed by the D/A conversion unit 124-1 into a radio signal (or an RF signal) in a radio band (or a radio frequency (RF) band) (up-conversion). The mixer 126-1 outputs the radio signal to the amplifier 127-1.

The amplifier 127-1 amplifies the radio signal, and outputs the amplified radio signal to the coupler 129-1.

The coupler 129-1 is, for example, a branching circuit. The coupler 129-1 causes the amplified radio signal to branch out to be output to the BPF 130-1 and the switch 131.

The BPF 130-1 is, for example, a filter circuit. The BPF 130-1 allows signals in a frequency band to pass and does not allow signals outside the frequency band to pass. Accordingly, the BPF 130-1 removes an unwanted frequency component included in a radio signal. In the first embodiment, CAL signals have frequencies outside the base band. The BPF 130-1 removes frequency components of the CAL signals, and is thus able to remove the CAL signals from the radio signal. The BPF 130-1 outputs the radio signal from which the CAL signals have been removed to the antenna 140-1.

For example, by switching processing, the switch 131 outputs the radio signal output from the coupler 129-1 to the A/D conversion unit 132 or outputs a radio signal output from the coupler 129-2 to the A/D conversion unit 132. The switch 131 allows any one of radio signals converted at processing block systems for multiple transmission signals (in FIG. 2, the upper processing block system and the lower processing block system) to be output to the EQ filter coefficient generation unit 133 through the A/D conversion unit 132. Accordingly, in the RRH 120, calibration processing may be performed for any one of multiple transmission signals.

The mixer 137 is, for example, a mixing device. The mixer 137 multiplies the radio signal by the oscillation signal output from the local oscillator 136 to convert the radio signal in the RF band into an analog signal in the IF band that may be processed by the A/D conversion unit 132 (down-conversion).

The A/D conversion unit 132 converts the analog signal output from the mixer 137 into a digital signal. The A/D conversion unit 132 outputs the resultant digital signal as a feedback signal (hereinafter, may be referred to as an "FB signal") to the EQ filter coefficient generation unit 133.

The EQ filter coefficient generation unit 133 estimates, for example, based on the CAL signals output from the CAL signal generation unit 122-1 and the FB signal output from the A/D conversion unit 132, the phase at a center frequency in a specific frequency band of the transmission signal. Then, the EQ filter coefficient generation unit 133 generates an EQ filter coefficient corresponding to the estimated phase, based on the estimated phase. For example, the EQ filter coefficient is a phase correction coefficient, and the EQ filter coefficient generation unit 133 also functions as a phase correction coefficient generation unit that generates a phase correction coefficient. The EQ 121-1 uses the EQ filter coefficient for phase correction of the transmission signal. Processing for generating an EQ filter coefficient will be explained below by way of an operation example.

In FIG. 2, the EQs 121-1 and 121-2, the CAL signal generation units 122-1 and 122-2, the adding units 123-1 and 123-2, and the EQ filter coefficient generation unit 133 are able to implement corresponding functions, for example, with a field programmable gate array (FPGA). However, instead of the FPGA, a controller such as a digital signal processor (DSP), a central processing unit (CPU), or a microprocessing unit (MPU) or a processor may be used.

<Relationship of Transmission Signal, CAL Signal, and FB Signal>

FIG. 3 illustrates an example of the configuration of the base station 100. In FIG. 3, an example of the relationship of a transmission signal, CAL signals, and an FB signal is illustrated. In FIG. 3, part of the example of the configuration of the base station 100 illustrated in FIG. 2 is illustrated, where the EQ 121-1 is represented by the EQ 121, the CAL signal generation unit 122-1 is represented by the CAL signal generation unit 122, and the adding unit 123-1 is represented by the adding unit 123. Furthermore, the analog unit 128-1 is represented by a calibration target 135, the coupler 129-1 is represented by the coupler 129, and the BPF 130-1 is represented by the BPF 130. The D/A conversion unit 124-1 illustrated in FIG. 2 may be included in the calibration target 135.

In FIG. 3, some blocks (for example, the switch 131 and the A/D conversion unit 132) of the base station 100 illustrated in FIG. 2 are not illustrated. An example of phase characteristics of individual signals (the vertical axis represents a phase (p) and the horizontal axis represents a frequency (f)) is illustrated as the example of the individual signals illustrated in FIG. 3.

As illustrated in FIG. 3, a transmission signal input to the EQ 121 contains a frequency component in the base band. In contrast, the CAL signal generation unit 122 generates four CAL signals having frequencies outside the base band. In the first embodiment, each of the CAL signals has continuous waves (CWs) (or non-modulated continuous waves). The transmission signal may be referred to as a main signal when being compared with a CAL signal.

Figure 4A:
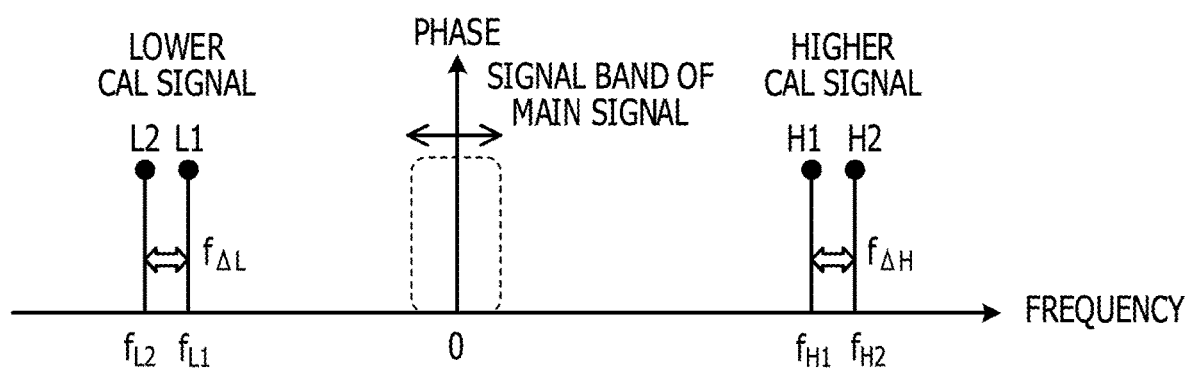
FIG. 4A illustrates a frequency arrangement of the CAL signals.

FIG. 4A illustrates an example of the phase characteristics of CAL signals. In FIG. 4A, a center frequency in the frequency band (or the base band, hereinafter, may be referred to as a "signal band") of a main signal is set to "0". In actuality, the main signal includes, for example, a signal band whose center is a certain frequency that is not "0".

As illustrated in FIG. 4A, the CAL signal generation unit 122 generates, with respect to the signal band of the main signal, four CAL signals, which are two CAL signals on a low frequency side and two CAL signals on a high frequency side. Two CAL signals L2 and L1 on the low frequency side have frequencies $f_{L2}$ and $f_{L1}$, respectively, when the center frequency of the signal band of the main signal is set to "0". Two CAL signals H2 and H1 on the high frequency side have frequencies $f_{H2}$ and $f_{H1}$, respectively, when the center frequency of the signal band of the main signal is set to "0".

Figure 4B:
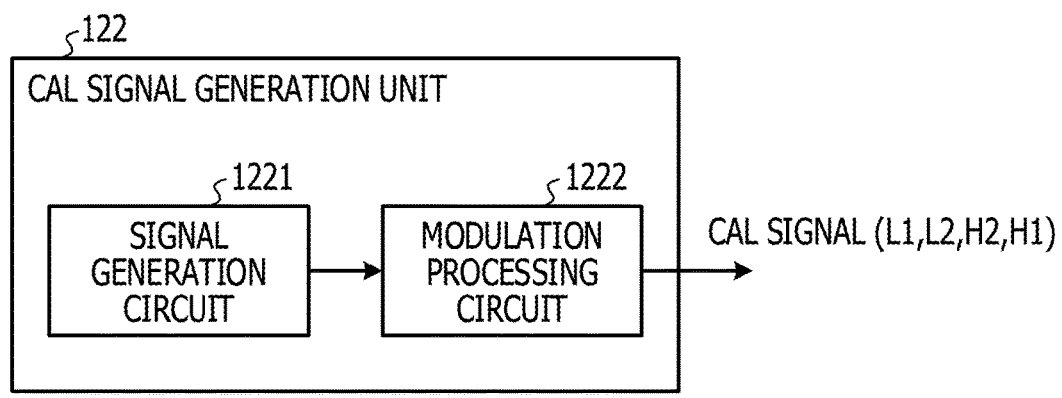
FIG. 4B illustrates an example of a configuration of a CAL signal generation unit.

FIG. 4B illustrates an example of the configuration of the CAL signal generation unit 122.

The CAL signal generation unit 122 includes a signal generation circuit 1221 and a modulation processing circuit 1222. The signal generation circuit 1221 generates, for example, a signal at a certain output level. For example, the modulation processing circuit 1222 modulates, based on a certain frequency, a signal output from the signal generation circuit 1221, so that a CAL signal having the corresponding frequency component may be generated. Therefore, the modulation processing circuit 1222 modulates signals from the signal generation circuit 1221, based on the frequencies $f_{L2}$, $f_{L1}$, $f_{H2}$, and $f_{H1}$, so that four CAL signals having the frequencies $f_{L2}$, $f_{L1}$, $f_{H2}$, and $f_{H1}$ may be generated.

Referring back to FIG. 3, the adding unit 123 adds the transmission signal to the CAL signals, and the CAL signals and the main signal may thus become calibration targets.

These signals are converted into a radio signal, and CAL signal components are removed by the BPF 130. Accordingly, the radio signal containing a main signal component is transmitted.

The EQ filter coefficient generation unit 133 generates an EQ coefficient based on reference (REF) signals, which are calibration signals, and an FB signal, which is a radio signal that has branched off from the coupler 129.

<Example of Configuration of EQ Filter Coefficient Generation Unit>

Figure 5:
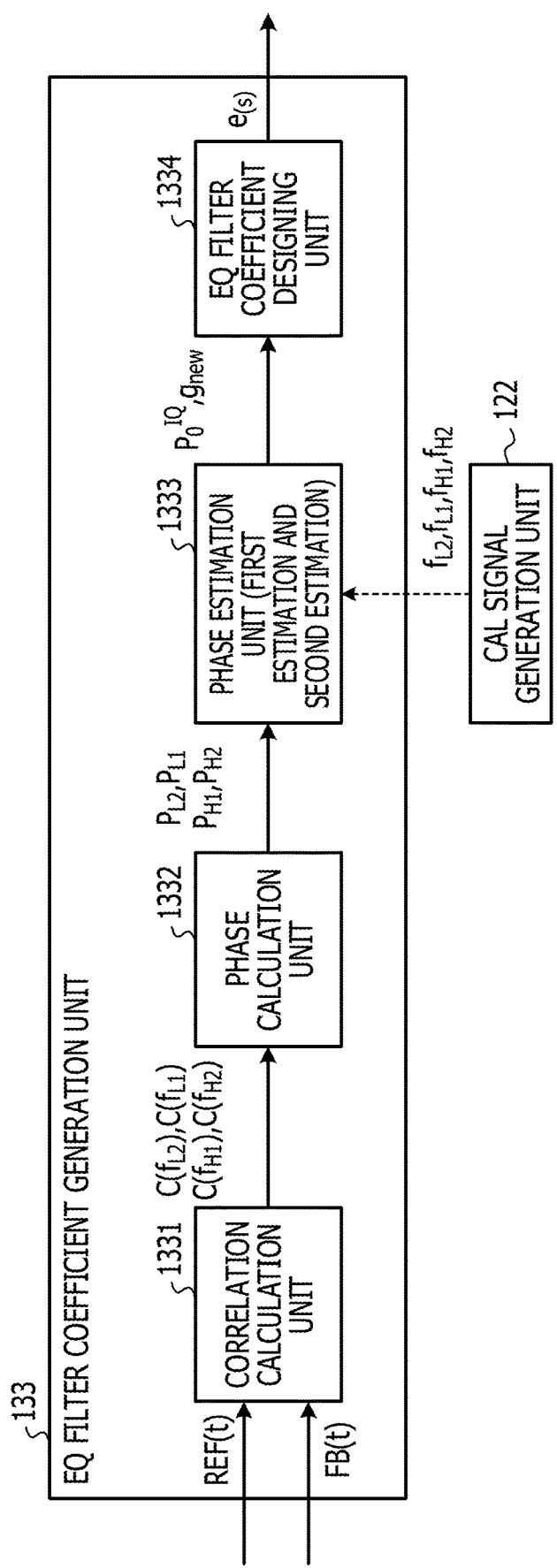
FIG. 5 illustrates an example of a configuration of an EQ filter coefficient generation unit.

FIG. 5 illustrates an example of a configuration of the EQ filter coefficient generation unit 133.

The EQ filter coefficient generation unit 133 includes a correlation calculation unit 1331, a phase calculation unit 1332, a phase estimation unit 1333, and an EQ filter coefficient designing unit 1334.

The correlation calculation unit 1331 performs correlation calculation based on the REF signals and the FB signal, and outputs correlation calculation results $C(f_{L2})$, $C(f_{L1})$, $C(f_{H2})$, and $C(f_{H1})$. The correlation calculation unit 1331 calculates the correlation calculation results $C(f_{L2})$, $C(f_{L1})$, $C(f_{H2})$, and $C(f_{H1})$ using Equations 1 to 4, for example.

$$C(f_{L2}) = \Sigma(FB(t) * \overline{c\_FL2(t)}) \quad (1)$$

$$C(f_{L1}) = \Sigma(FB(t) * \overline{c\_FL1(t)}) \quad (2)$$

$$C(f_{H2}) = \Sigma(FB(t) * \overline{c\_FH2(t)}) \quad (3)$$

$$C(f_{H1}) = \Sigma(FB(t) * \overline{c\_FH1(t)}) \quad (4)$$

In Equations (1) to (4), t represents a sample number. In Equation (1), c_FL2(t) represents a CAL signal having the frequency $f_{L2}$ out of the REF signals. In Equation (2), c_FL1(t) represents a CAL signal having the frequency $f_{L1}$ out of the REF signals. In Equation (3), c_FH2(t) represents a CAL signal having the frequency $f_{H2}$ out of the REF signal. In Equation (4), c_FH1(t) represents a CAL signal having the frequency $f_{H1}$ out of the REF signals.

Figure 6A:
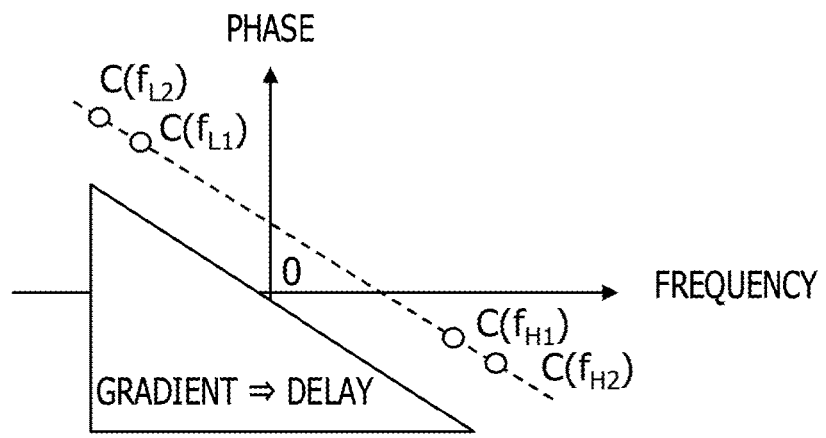
FIG. 6A illustrates an example of the phase characteristics of a CAL signal.
Figure 6B:
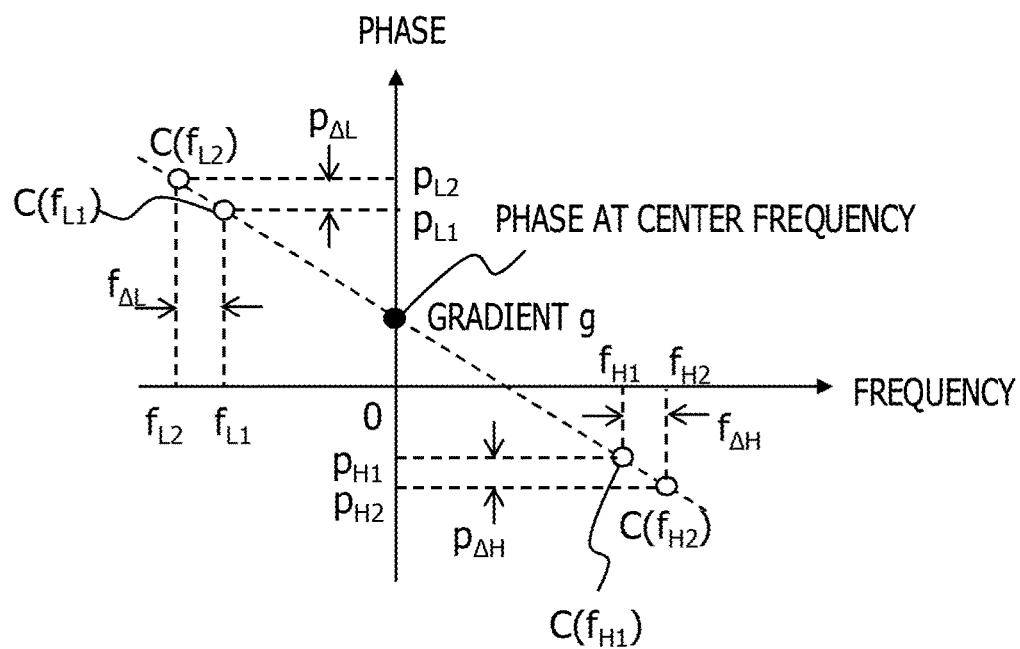
FIG. 6B illustrates an example of the phase characteristics of a CAL signal.

FIGS. 6A and 6B illustrate examples of phase characteristics of the correlation calculation results $C(f_{L2})$, $C(f_{L1})$, $C(f_{H2})$, and $C(f_{H1})$. In FIG. 6A, the horizontal axis represents a frequency, and the vertical axis represents a phase. By performing correlation calculation represented by Equations (1) to (4), for example, points in FIGS. 6A and 6B illustrating phase characteristics are calculated.

For example, the correlation calculation unit 1331 causes Equations (1) to (4) to be stored in an internal memory, reads Equations (1) to (4) when performing processing, and substitutes the REF signals and the FB signal into Equations (1) to (4). Accordingly, the correlation calculation results $C(f_{L2})$, $C(f_{L1})$, $C(f_{H2})$, and $C(f_{H1})$ are obtained.

Referring back to FIG. 5, the phase calculation unit 1332 calculates phases $p_{L2}$, $p_{L1}$, $p_{H2}$, and $p_{H1}$ at the four points, based on the correlation calculation results $C(f_{L2})$, $C(f_{L1})$, $C(f_{H2})$, and $C(f_{H1})$.

For example, as illustrated in FIG. 6B, in the drawing illustrating phase characteristics, the phases $p_{L2}$, $p_{L1}$, $p_{H2}$, and $p_{H1}$ at the points $C(f_{L2})$, $C(f_{L1})$, $C(f_{H2})$, and $C(f_{H1})$ are obtained.

The phase calculation unit 1332 calculates the phases $p_{L2}$, $p_{L1}$, $p_{H2}$, and $p_{H1}$, for example, using Equations (5) to (8).

$$p_{L2} = \arg(C(f_{L2})) \quad (5)$$

$$p_{L1} = \arg(C(f_{L1})) \quad (6)$$

$$p_{H2} = \arg(C(f_{H2})) \quad (7)$$

$$p_{H1} = \arg(C(f_{H1})) \quad (8)$$

For example, the phase calculation unit 1332 causes Equations (5) to (8) to be stored in the internal memory, and reads Equations (5) to (8) when performing processing. The phase calculation unit 1332 substitutes the correlation calculation results $C(f_{L2})$, $C(f_{L1})$, $C(f_{H2})$, and $C(f_{H1})$ into Equations (5) to (8). Accordingly, the phases $p_{L2}$, $p_{L1}$, $p_{H2}$, and $p_{H1}$ are obtained.

Referring back to FIG. 5, the phase estimation unit 1333 performs first estimation, and then performs second estimation. Eventually, the phase estimation unit 1333 estimates a phase at the center frequency in the signal band of the main signal. First, the first estimation will be explained.

<1. First Estimation>

FIG. 6B illustrates an example of calculation of first estimation. In the first estimation, the phase estimation unit 1333 calculates the gradient of a phase based on the two points ($C(f_{L2})$ and $C(f_{L1})$) on the low frequency side, and calculates the gradient of a phase based on the two points ($C(f_{H2})$ and $C(f_{H1})$) on the high frequency side. Then, the phase estimation unit 1333 calculates a gradient g of phase characteristics, based on the obtained gradients. The phase estimation unit 1333 calculates the gradient g using Equation (9).

$$g = \frac{\frac{p_{\Delta L}}{f_{\Delta L}} + \frac{p_{\Delta H}}{f_{\Delta H}}}{2} \quad (9)$$

In Equation (9), $p_{\Delta L}$ represents a phase variation amount between the two points $C(f_{L2})$ and $C(f_{L1})$, and is represented by Equation (10).

$$p_{\Delta L} = p_{L1} - p_{L2} \quad (10)$$

Furthermore, in Equation (9), $p_{\Delta H}$ represents a phase variation amount between the two points $C(f_{H1})$ and $C(f_{H2})$, and is represented by Equation (11).

$$p_{\Delta H} = p_{H2} - p_{H1} \quad (11)$$

Furthermore, in Equation (9), $f_{\Delta L}$ represents a frequency difference between the two points $C(f_{L2})$ and $C(f_{L1})$, and is represented by Equation (12).

$$f_{\Delta L} = f_{L1} - f_{L2} \quad (12)$$

Furthermore, in Equation (9), $f_{\Delta H}$ represents a frequency difference between the two points $C(f_{H1})$ and $C(f_{H2})$, and is represented by Equation (13).

$$f_{\Delta H} = f_{H2} - f_{H1} \quad (13)$$

As represented by Equations (9) to (13) and illustrated in FIG. 6B, a phase variation amount (or a phase difference) for a frequency difference between the two correlation calculation results ($C(f_{H1})$ and $C(f_{H2})$) corresponding to the two CAL signals on the high frequency side represents the gradient on the high frequency side. Furthermore, a phase variation amount (or a phase difference) for a frequency difference between the two correlation calculation results corresponding to the two CAL signals on the low frequency side represents the gradient on the low frequency side. The gradient g represents the average of the gradient on the high frequency side and the gradient on the low frequency side.

For example, the phase estimation unit 1333 performs the processing described below. For example, the phase estimation unit 1333 reads Equations (9) to (13) stored in the internal memory. The phase estimation unit 1333 also receives the phases $p_{L2}$, $p_{L1}$, $p_{H2}$, and $p_{H1}$ from the phase calculation unit 1332. The phase estimation unit 1333 also receives REF signals and the frequencies $f_{L2}$, $f_{L1}$, $f_{H2}$, and $f_{H1}$ of the REF signals from the CAL signal generation unit 122. The phase estimation unit 1333 substitutes the received phases $p_{L2}$, $p_{L1}$, $p_{H2}$, and $p_{H1}$ and the frequencies $f_{L2}$, $f_{L1}$, $f_{H2}$, and $f_{H1}$ into Equations (9) to (13) to obtain the gradient g.

However, as is clear from Equation (9), the gradient g represents the average of the gradient of the two points on the high frequency side and the gradient of the two points on the low frequency side. Therefore, for example, the gradient g itself does not represent an accurate gradient. However, the obtained gradient g falls within a certain range including the accurate gradient, and at least, the direction of the gradient g matches the direction of the accurate gradient (in terms of whether the gradient direction is a right downward direction or a right upward direction in FIG. 6B).

In the subsequent second estimation, the phase estimation unit 1333 calculates the gradient of phases between the low frequency end ($C(f_{L2})$) and the high frequency end ($C(f_{H2})$), and obtains a gradient $g_{new}$ closest to the gradient g. Then, the phase estimation unit 1333 obtains the phase $p_0^{IQ}$ at the center frequency, based on the obtained gradient $g_{new}$.

<2. Second Estimation>

Figure 7A:
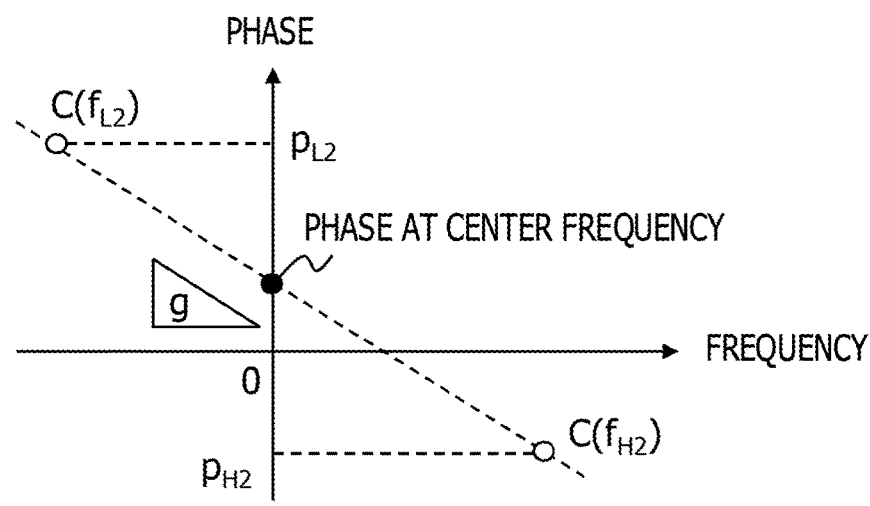
FIG. 7A illustrates an example of the phase characteristics of a CAL signal.

FIG. 7A illustrates an example of calculation of the second estimation.

First, the phase estimation unit 1333 calculates a phase variation angle between the low frequency end ($C(f_{L2})$) and the high frequency end ($C(f_{H2})$). The phase estimation unit 1333 calculates a phase variation angle $p_{L2 \Rightarrow H2}$, using Equation (14).

$$p_{L2 \Rightarrow H2} = p_{L2} - p_{H2} \quad (14)$$

Next, the phase estimation unit 1333 calculates the gradient $g_{new}$ between the low frequency end ($C(f_{L2})$) and the high frequency end ($C(f_{H2})$).

In this case, the low frequency end $C(f_{L2})$ and the high frequency end $C(f_{H2})$ may be rotated by 180 degrees or more.

Figure 7B:
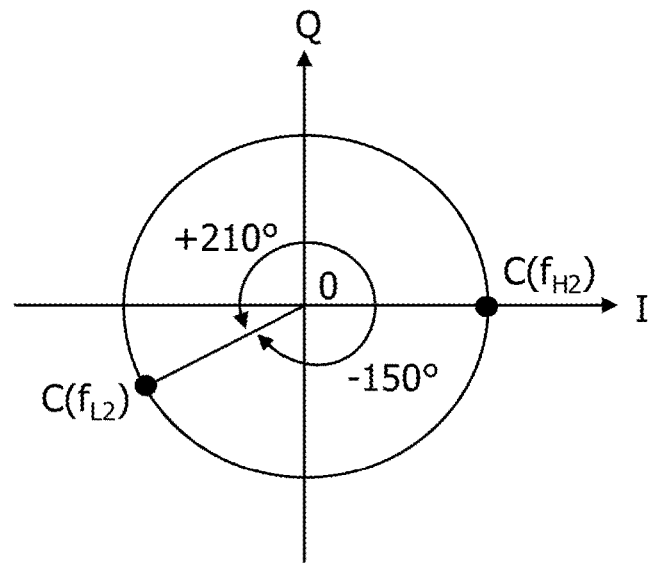
FIG. 7B illustrates an example of constellation of a CAL signal.

FIG. 7B illustrates an example of constellation of a CAL signal in the case where the low frequency end $C(f_{L2})$ is rotated by "+210 degrees" with respect to the high frequency end $C(f_{H2})$. As illustrated in FIG. 7B, in the case where the low frequency end $C(f_{L2})$ is rotated by "+210 degrees" with respect to the high frequency end $C(f_{H2})$, the low frequency end $C(f_{L2})$ may be rotated by "−150 degrees" with respect to the high frequency end $C(f_{H2})$.

Figure 8:
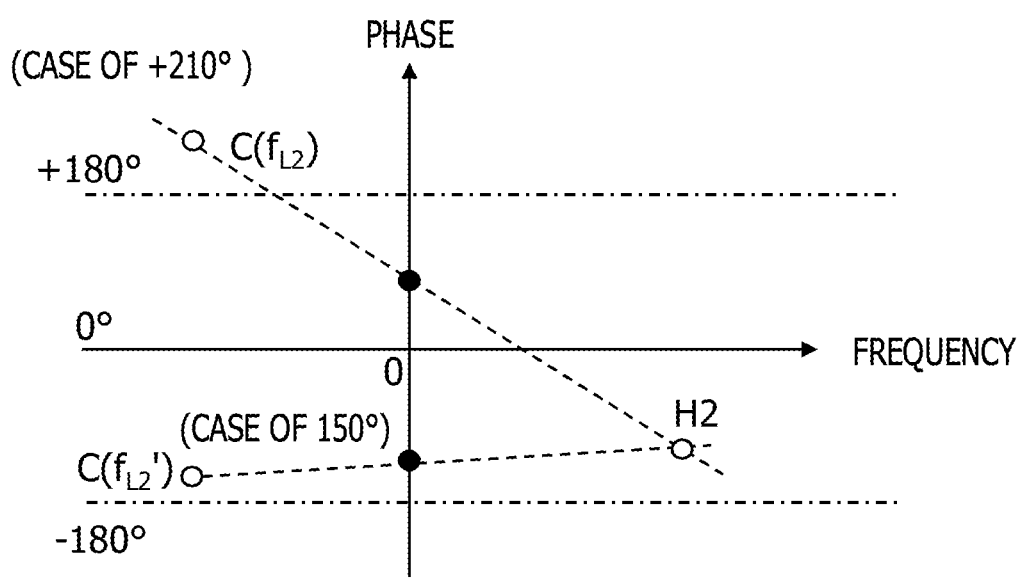
FIG. 8 illustrates an example of the phase characteristics of a CAL signal.

FIG. 8 illustrates an example of phase characteristics in the case of rotation by "+210 degrees" and in the case of rotation by "−150 degrees". As illustrated in FIG. 8, in the case of rotation by "+210 degrees", a right downward gradient is obtained, whereas in the case of rotation by "−150 degrees", a right upward gradient is obtained.

For calculation of the gradient between the two points $C(f_{L2})$ and $C(f_{H2})$, taking into consideration that a rotation of "+180 degrees" or more is made between the two points ($C(f_{L2})$ and $C(f_{H2})$), the phase estimation unit 1333 obtains two gradients. The phase estimation unit 1333 obtains, as the gradient of the phases of the two points, the gradient closest to the gradient g obtained by the first estimation, out of the calculated two gradients. However, in the calculation, the phase estimation unit 1333 calculates the gradient $g_{new}$ between three points, using Equation (15), selects a candidate $g_{new}$ closest to the gradient g, and sets the selected candidate as the gradient new of the phases of two points.

$$g_{new} = \begin{cases} P_{L2 \to H2} / f_{L2 \to H2} \\ (P_{L2 \to H2} + 2\pi) / f_{L2 \to H2} \\ (P_{L2 \to H2} - 2\pi) / f_{L2 \to H2} \end{cases} \quad (15)$$

For example, in the case of rotation by "+210 degrees", the phase estimation unit 1333 calculates three gradients, $g_{new}$=+210, +570, and −150. The phase estimation unit 1333 selects a candidate closest to the gradient g from among the three gradients $g_{new}$. In this case, the phase estimation unit 1333 selects the gradient $g_{new}$=+210, as a candidate closest to the gradient g. The gradient g obtained by the first estimation is not accurate, as described above. However, the gradient g falls within a certain range including a correct value, and the direction of the gradient g and the direction of the correct value match. Furthermore, for example, in the case of rotation by "−150 degrees", the phase estimation unit 1333 calculates the three gradients $g_{new}$=−150, +210, and −510, and selects a candidate, for example, $g_{new}$=−150, closest to the gradient g.

Next, the phase estimation unit 1333 calculates a phase $p_0^{IQ}$ at the center frequency, based on the estimated gradient $g_{new}$. For example, the phase estimation unit 1333 performs calculation using Equations (16) and (17).

$$p_{L2} = g_{new} f_{L2} + p_0^{IQ} \quad (16)$$

$$p_{H2} = g_{new} f_{H2} + p_0^{IQ} \quad (17)$$

For example, the phase estimation unit 1333 causes Equations (14) to (17) to be stored in the internal memory, reads Equations (14) to (17) when performing processing, and substitutes the phases $p_{L2}$ and $p_{H2}$ received from the phase calculation unit 1332 and the frequencies $f_{L2}$ and $f_{H2}$ of the REF signals received from the CAL signal generation unit 122 into Equations (14) to (17). At this time, the phase estimation unit 1333 selects a candidate closest to the gradient g from among the three gradients $g_{new}$. The phase estimation unit 1333 outputs the selected gradient $g_{new}$ and the calculated phase $p_0^{IQ}$ at the center frequency to the EQ filter coefficient designing unit 1334.

Examples of processing for the first estimation and the second estimation have been described above.

Referring back to FIG. 5, the EQ filter coefficient designing unit 1334 generates an EQ filter coefficient e(s) (s=−8, −7, . . . , 0, . . . , 6, and 7 (in the case of 16 taps), based on the gradient $g_{new}$ and the phase $p_0^{IQ}$.

The EQ filter coefficient designing unit 1334 calculates a delay time $t_d$ [sample] per sampling frequency $f_s$ from the gradient $g_{new}$, for example, using Equation (18).

$$t_d = -\frac{g_{new} * f_s}{2\pi} \quad (18)$$

In Equation (18), the sampling frequency fs represents, for example, a sampling frequency for a transmission signal when being input to the RRH 120.

Then, the EQ filter coefficient designing unit 1334 calculates an EQ filter coefficient e(s) for cancelling the delay $t_d$ and the phase $p_0^{IQ}$, for example, using Equation (19).

$$e(s) = (p_0^{IQ}) * \sin c(s + t_d) \quad (19)$$

A method for designing the EQ filter coefficient e(s) will be explained.

Figure 9A:
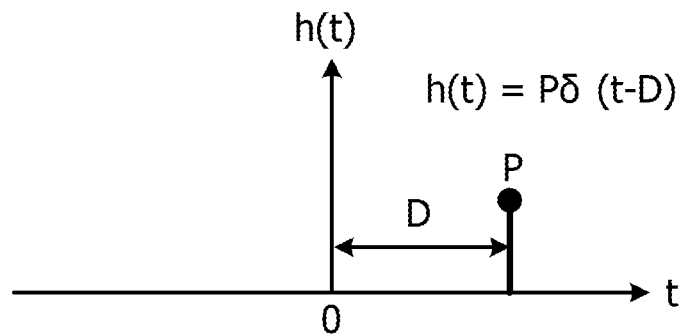
FIG. 9A illustrates an example of the time response characteristics of a calibration target.

FIG. 9A illustrates an example of time response characteristics of an output h(t) with respect to an input t of the calibration target 135. In FIG. 9A, a delay is represented by D, and a phase is represented by P. The delay time $t_d$ is calculated using Equation (18), and the phase $p_0^{IQ}$ is calculated by the phase estimation unit 1333. Therefore, the time response characteristics illustrated in FIG. 9A may be obtained, where the delay D is represented by $t_d$ and the phase P is represented by $p_0^{IQ}$.

Figure 9B:
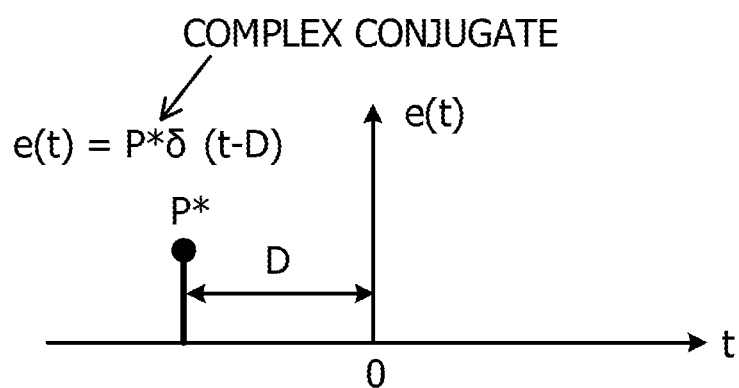
FIG. 9B illustrates an example of the time response characteristics of an EQ filter coefficient.

In this case, for example, the EQ filter coefficient designing unit 1334 may generate an EQ filter coefficient e(t) having the time response characteristics illustrated in FIG. 9B.

Figure 9C:
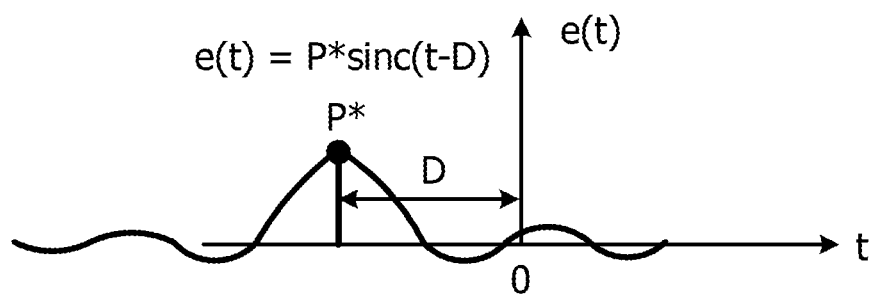
FIG. 9C illustrates an example of the time response characteristics of an EQ coefficient.

However, to achieve the time response characteristics illustrated in FIG. 9B using a discrete time filter, the EQ filter coefficient designing unit 1334 generates the EQ filter coefficient e(t), for example, using a sin c function (sin c(t)=sin(t)/t) illustrated in FIG. 9C. In the EQ filter coefficient e(s) represented by Equation (19), the input t in the EQ filter coefficient e(t) illustrated in FIG. 9C is represented by a specific number s of taps.

For example, the EQ filter coefficient designing unit 1334 causes Equations (18) and (19) to be stored in the internal memory, reads Equations (18) and (19) from the internal memory when performing processing, and substitute the delay $t_d$ and the phase $p_0^{IQ}$ into Equations (18) and (19). Accordingly, for example, the EQ filter coefficient designing unit 1334 generates the EQ filter coefficient e(s).

Referring back to FIG. 2, the EQ filter coefficient designing unit 1334 outputs the generated EQ filter coefficient e(s) to the EQ 121. The EQ 121 corrects the phase of the transmission signal, based on the EQ filter coefficient e(s). Accordingly, for example, a transmission signal h(t) in which the delay D is 0 may be obtained using a cancellation signal e(t), from the transmission signal h(t) illustrated in FIG. 9A.

Operation Example

Figure 10:
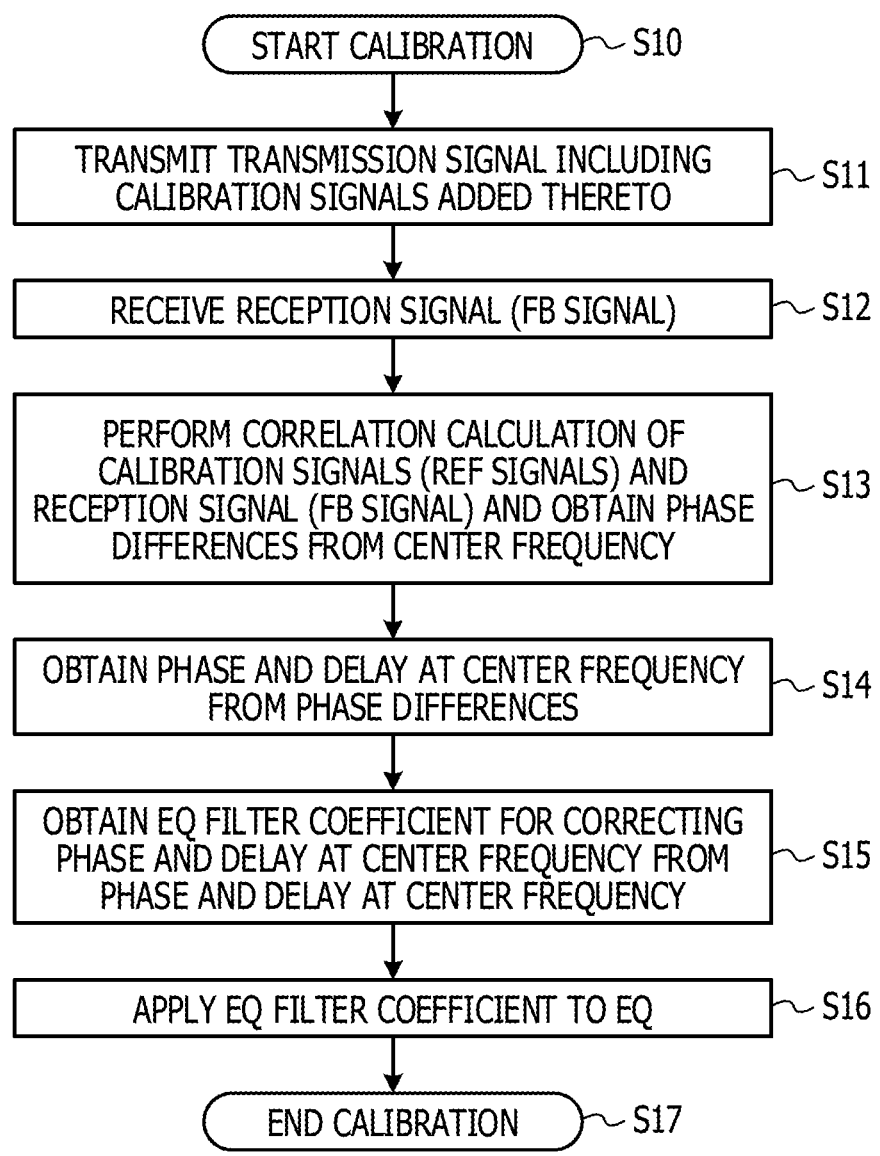
FIG. 10 is a flowchart illustrating an example of an operation in a base station apparatus.

Next, an operation example will be explained. FIG. 10 is a flowchart illustrating an operation example in the base station 100.

When starting a calibration process (S10), the base station 100 adds calibration signals to a transmission signal, and transmits the transmission signal including the calibration signals (S11). For example, the adding unit 123-1 adds CAL signals received from the CAL signal generation unit 122-1 to the transmission signal, and outputs the transmission signal including the CAL signals to the D/A conversion unit 124-1.

Next, the base station 100 receives a reception signal (FB signal) (S12). For example, the EQ filter coefficient generation unit 133 receives the FB signal via the coupler 129-1 or the like.

Next, the base station 100 performs correlation calculation of the REF signals and the FB signal, and calculates phase differences from the center frequency of the transmission signal (S13). For example, the EQ filter coefficient generation unit 133 performs processing described below. For example, the correlation calculation unit 1331 calculates correlation calculation results $C(f_{L2})$, $C(f_{L1})$, $C(f_{H2})$, and $C(f_{H1})$, using Equations (1) to (4). Then, the phase calculation unit 1332 substitutes the correlation calculation results $C(f_{L2})$, $C(f_{L1})$, $C(f_{H2})$, and $C(f_{H1})$ into Equations (5) to (8) to obtain the phases $p_{L2}$, $P_{L1}$, $p_{H2}$, and $p_{H1}$. These phases $p_{L2}$, $p_{L1}$, $p_{H2}$, and $p_{H1}$ represent phase differences from the center frequency, for example, as illustrated in FIG. 6B.

Referring back to FIG. 10, next, the base station 100 calculates, based on the phase differences, a phase and a delay (or a gradient) at the center frequency of the transmission signal (S14). For example, the phase estimation unit 1333 performs the first estimation, using Equations (9) to (13), and then performs the second estimation, using Equations (14) to (17), to calculate the phase $p_0^{IQ}$ and the gradient $g_{new}$.

Next, the base station 100 calculates an EQ filter coefficient for correcting the phase of the transmission signal, based on the phase and the delay at the center frequency (S15). For example, the EQ filter coefficient generation unit 133 calculates the EQ filter coefficient e(s), based on the phase $p_0^{IQ}$ and the gradient $g_{new}$, using Equations (18) and (19).

Next, the base station 100 applies the EQ filter coefficient e(s) to the EQ 121 (S16).

Then, the base station 100 ends the calibration process (S17).

As described above, in the first embodiment, the base station 100 estimates the phase $p_0^{IQ}$ at the center frequency of a transmission signal, based on a higher-frequency CAL signal and a lower-frequency CAL signal outside the frequency band of the transmission signal (for example, S14 in FIG. 10). Then, the base station 100 calculates the EQ filter coefficient e(s) for correcting the phase of the transmission signal, based on the estimated phase $p_0^{IQ}$ (for example, S15 in FIG. 10).

In this case, the base station 100 estimates the phase $p_0^{IQ}$ at the center frequency of the transmission signal, based on the higher-frequency CAL signal and the lower-frequency CAL signal with the frequency band of the transmission band sandwiched therebetween. Therefore, compared to the case where a phase is estimated without using such signals, an accurate $p_0^{IQ}$ at the center frequency may be obtained. Therefore, the base station 100 is able to achieve an increase in the accuracy of calibration.

For example, in the base station 100, calibration may be performed with the signal level of a CAL signal being reduced to an extent that a main signal is not degraded. However, if a CAL signal is reduced to a weak level, it takes time to detect the CAL signal, and a certain time may be required for convergence of calibration. However, in the first embodiment, calibration may be performed without reducing a CAL signal to a weal level. Therefore, compared to the case where the signal level is reduced to a weak level, convergence time for phase correction may be shortened.

For example, in the base station 100, calibration may be performed by transmitting a transmission signal using a time division duplex (TDD) system, inserting a CAL signal into a gap section between an uplink (UL) direction and a downlink (DL) direction. However, in this case, a CAL signal may not be used in a frequency division duplex (FDD) system, and calibration may not be performed. In the first embodiment, calibration may be performed by adding a CAL signal to a transmission signal, regardless of the TDD system or the FDD system.

Furthermore, in the first embodiment, a CAL signal outside the frequency band of a data signal is removed by the BPF 130. Therefore, the CAL signal is not transmitted to the terminal 200.

In the first embodiment, the base station 100 performs calibration by causing the RRH 120 to generate a CAL signal. Therefore, in the base station 100, a CAL signal is not fed back to the BBU 110 or an FB signal is not fed back to the BBU 110. Thus, in the base station 100, compared to the case where calibration is performed on the BBU 110 side, there is no circuit for causing a CAL signal and an FB signal to be output to the BBU 110 side, and therefore, complicated processing is not performed.

In the example described above, an example in which calibration is performed using two higher-frequency CAL signals and two lower-frequency CAL signals has been explained. For example, the base station 100 may perform calibration using a higher-frequency CAL signal and a lower-frequency CAL signal.

Figure 11:
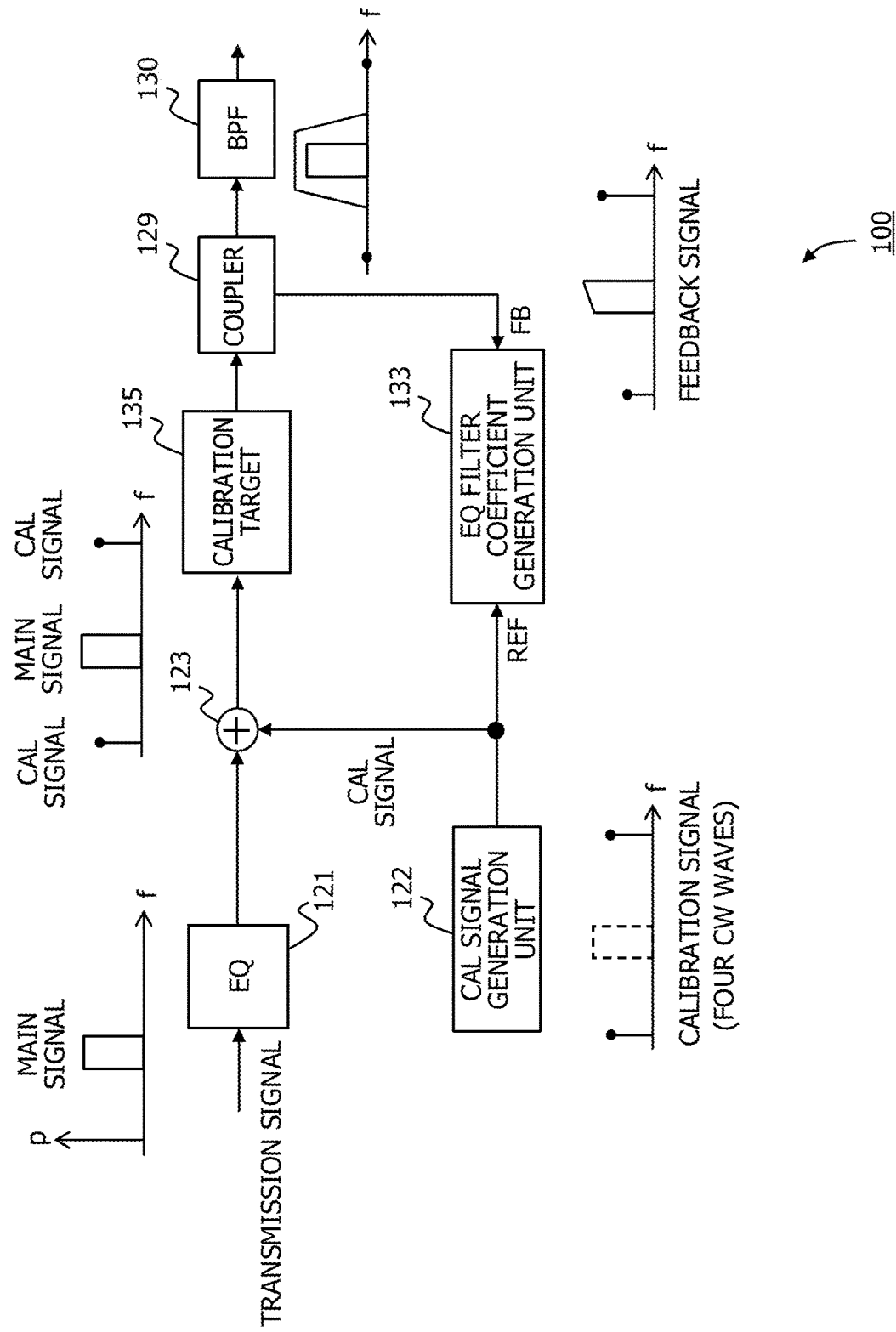
FIG. 11 illustrates an example of the relationship of a main signal, CAL signals, and an FB signal.

FIG. 11 illustrates an example of the relationship of CAL signals, an FB signal, and a transmission signal in such a case. In this case, the phase estimation unit 1333 calculates three gradients $g_{new}$, using Equation (15), without calculating the gradient g in the first estimation, and selects a candidate in a desired method. Then, the phase estimation unit 1333 calculates the phase $p_0^{IQ}$ at the center frequency, based on the selected gradient $g_{new}$.

Second Embodiment

Figure 12:
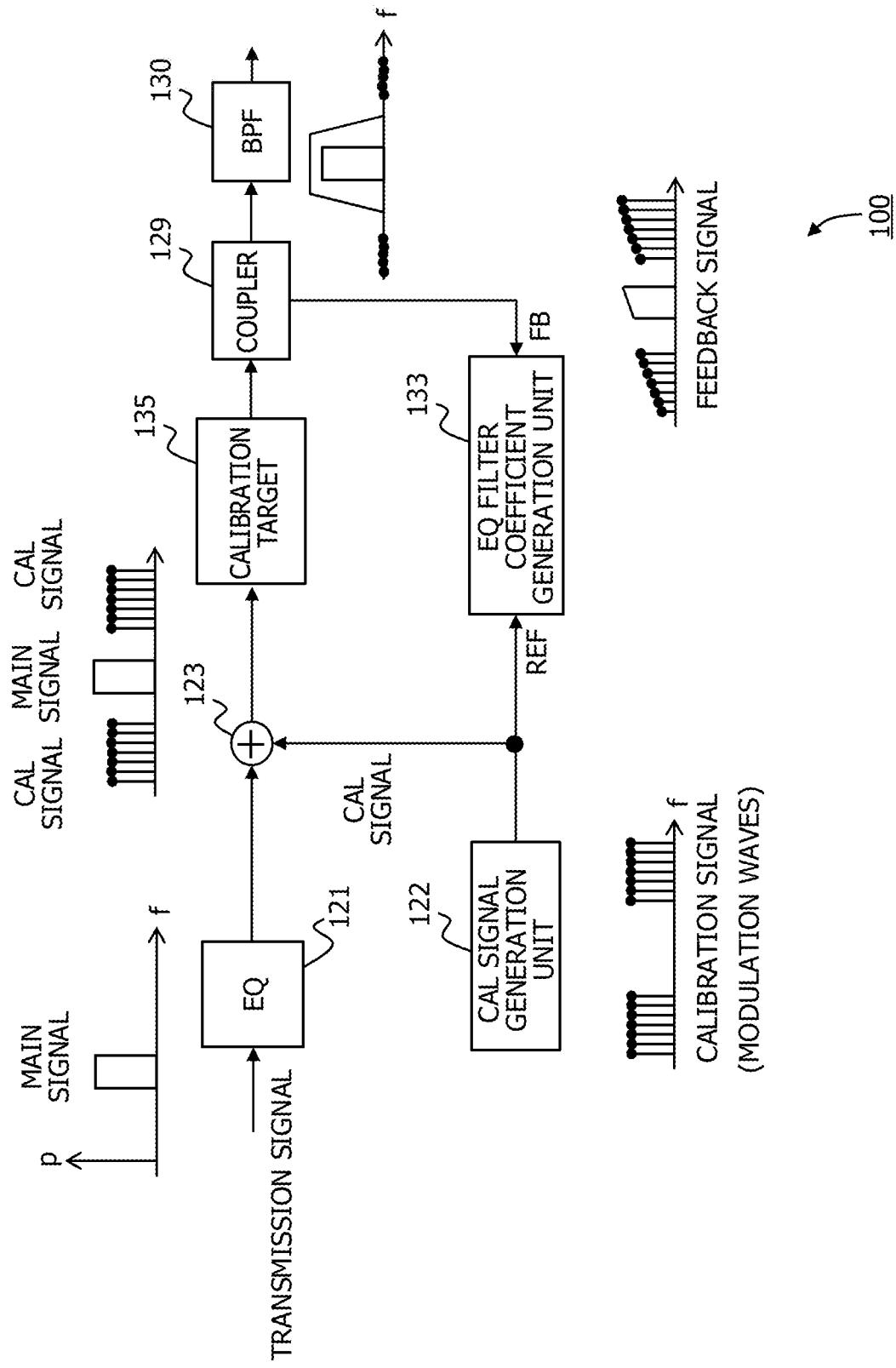
FIG. 12 illustrates an example of the relationship of a main signal, CAL signals, and an FB signal.

FIG. 12 illustrates an example of the relationship of a transmission signal (or a main signal), CAL signals, and an FB signal in a second embodiment. An example of the configuration of the base station 100 is illustrated in FIG. 2, as in the first embodiment. In FIG. 12, part of the configuration of the base station 100 is clearly illustrated, as in FIG. 3.

In the first embodiment, an example in which calibration is performed using CAL signals having CA waves has been explained. In the second embodiment, instead of CW waves, modulation waves are used.

CW waves are, for example, signal waves having a specific frequency component. In contrast, modulation waves are, for example, signal waves having multiple frequency components. For example, in the modulation processing circuit 1222 illustrated in FIG. 4B, a signal generated by performing modulation processing at a specific frequency for an output signal from the signal generation circuit 1221 may serve as a CW wave. In contrast, for example, in the modulation processing circuit 1222, multiple signals (or a signal having multiple frequency components) generated by performing modulation processing at multiple frequencies for an output signal may serve as modulation waves.

As illustrated in FIG. 12, in the second embodiment, the CAL signal generation unit 122 generates, as CAL signals, two modulation waves, a modulation wave having multiple frequencies included in a frequency band higher than the base band and a modulation wave having multiple frequencies included in a frequency band lower than the base band.

The adding unit 123 adds the CAL signals to the transmission signal (main signal), and the coupler 129 feeds backs the frequency-converted transmission signal, as an FB signal, to the EQ filter coefficient generation unit 133. The EQ filter coefficient generation unit 133 generates an EQ filter coefficient, based on the CAL signals (REF signals) and the FB signal.

Figure 13:
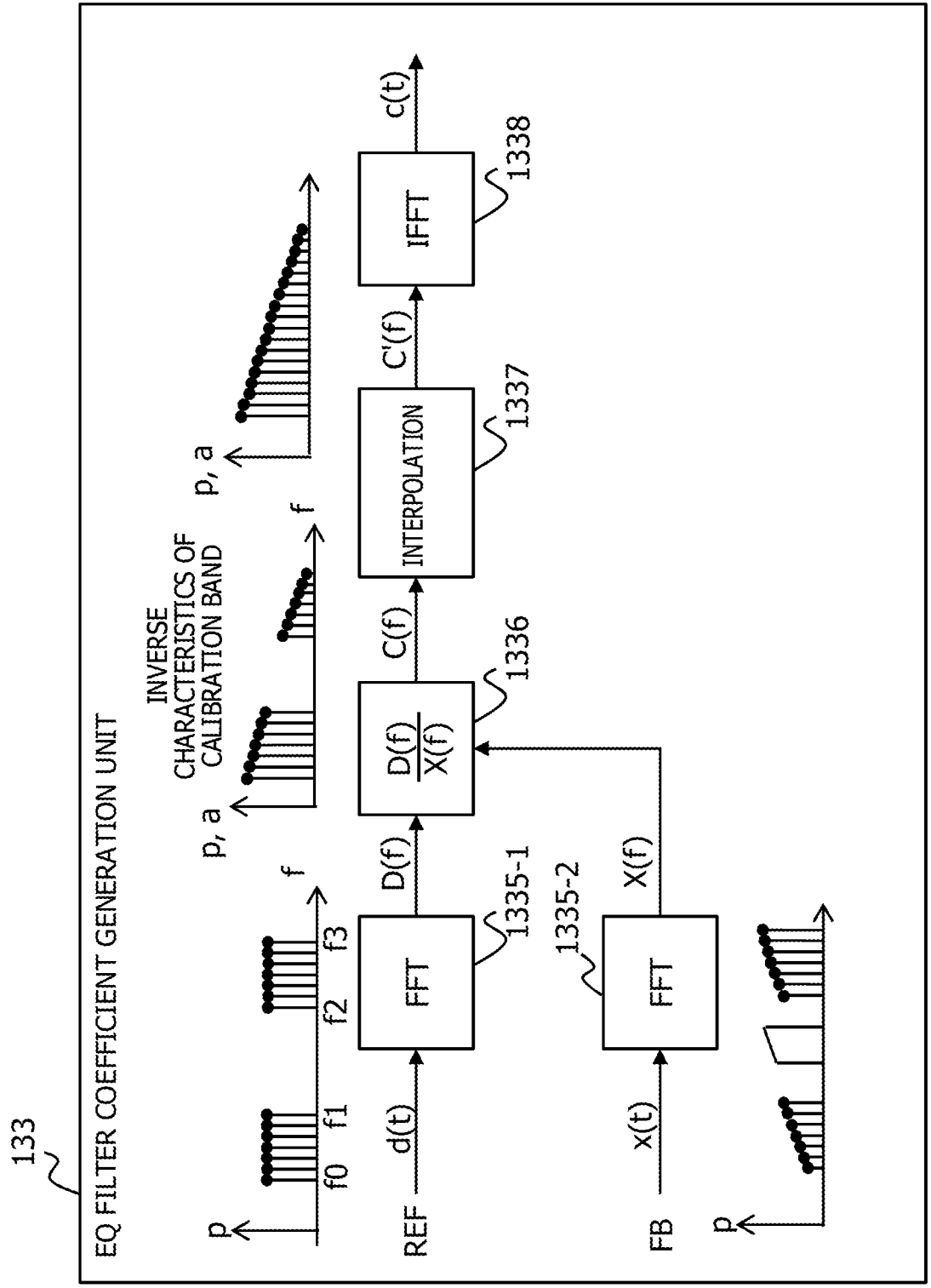
FIG. 13 illustrates an example of a configuration of an EQ filter coefficient generation unit.

FIG. 13 illustrates an example of a configuration of the EQ filter coefficient generation unit 133. In FIG. 13, characteristics of individual signals are illustrated. Regarding signals before fast Fourier transform (FFT) processing units 1335-1 and 1335-2, the horizontal axis represents the characters tics of a frequency (f), and the vertical axis represents the phase characteristics of a phase (p). Regarding signals in a range from the FFT processing units 1335-1 and 1335-2 to an inverse FFT (IFFT) processing unit 1338, the horizontal axis represents the characteristics of a frequency (f), and the vertical axis represents the characteristics of a phase (p) or an amplitude (a).

The EQ filter coefficient generation unit 133 includes the FFT processing units 1335-1 and 1335-2, a division processing unit 1336, an interpolation processing unit 1337, and the IFFT processing unit 1338.

The FFT processing unit 1335-1 performs Fourier transform processing for a REF signal to convert the REF signal d(t) in the time axis direction into a REF signal D(f) in the frequency axis direction. The FFT processing unit 1335-1 obtains a REF signal D(f), for example, using Equation (20).

$$D(f) = \sum_{t=0}^{N-1} d(t) * e^{-j\frac{2\pi ft}{N}} \quad (20)$$

However, N represents the number of samples of the REF signal d(t).

Furthermore, the FFT processing unit 1335-2 performs Fourie transform processing for an FB signal to convert the FB signal x(t) in the time axis direction into an FB signal X(f) in the frequency axis direction. The FFT processing unit 1335-2 obtains an FB signal X(f), for example, using Equation (21).

$$X(f) = \sum_{t=0}^{N-1} x(t) * e^{-j\frac{2\pi ft}{N}} \quad (21)$$

However, N represents the number of samples of the FB signal x(t).

The FFT processing units 1335-1 and 1335-2 read, for example, Equations (20) and (21) stored in the internal memory, and substitute the input REF signals d(t) and the FB signal x(t) into Equations (20) and (21). Accordingly, the REF signals D(f) and the FB signal X(f) may be obtained.

The division processing unit 1336 divides the REF signals D(f) by the FB signal X(f). The division processing unit 1336 performs division processing, for example, using Equation (22).

$$C(f) = \begin{cases} D(f)/X(f) & (f0 \leq f \leq f1, f2 \leq f \leq f3)) \\ 0 & \text{(OTHER CASES)} \end{cases} \quad (22)$$

In Equation (22), the highest frequency of higher-frequency CAL signals is represented by f0, the lowest frequency of the higher-frequency CAL signals is represented by f1, the highest frequency of lower-frequency CAL signals is represented by f2, and the lowest frequency of the lower-frequency CAL signals is represented by f3. By division, the division processing unit 1336 generates, for example, a signal C(f) having inverse characteristics relative to an FB signal.

For example, the division processing unit 1336 reads Equation (22) stored in the internal memory, and substitutes the REF signals D(f) and the FB signal X(f) into Equation (22). Accordingly, the signal C(f) having the inverse characteristics is generated.

The interpolation processing unit 1337 interpolates a phase (inverse characteristics) from the frequencies f1 to f2 with respect to the signal C(f) by the interpolation processing. The interpolation processing unit 1337 obtains an interpolation signal C'(f) obtained by interpolation, for example, using Equation (23).

$$C'(f_i) = \frac{(f_i - f_{i-\alpha}) * C(f_{i-\alpha}) - (f_i - f_{i+\alpha}) * C(f_{i+\alpha})}{f_{i+\alpha} - f_{i-\alpha}} \quad (23)$$

In Equation (23), $f_i$ represents a sample frequency (f1≤$f_i$≤f2), α represents a constant satisfying f0≤$f_{i-\alpha}$≤f1 and f2≤$f_{i-\alpha}$≤f3. Equation (23) represents an interpolation expression of linear interpolation by a least-squares method. The interpolation processing unit 1337 may perform interpolation processing using a well-known method different from Equation (23).

The center frequency of a transmission signal is, for example, in a range between f1 to f2. Therefore, the interpolation processing unit 1337 calculates a phase having inverse characteristics with respect to an FB signal, for example, in a frequency section including the center frequency of a transmission signal.

For example, the interpolation processing unit 1337 reads Equation (23) stored in the internal memory, and substitutes the signal C(f) having the inverse characteristics, the sample frequency $f_i$, the constant α, and the like into Equation (23). Accordingly, the interpolation signal C'(f) is obtained.

Referring back to FIG. 13, the IFFT processing unit 1338 performs inverse Fourier transform processing for the interpolation signal C'(f), and converts the interpolation signal C'(f) in the frequency axis direction into a signal c(t) in the time axis direction. The IFFT processing unit 1338 performs inverse Fourier transform processing, for example, using Equation (24).

$$c(t) = \frac{1}{N}\sum_{f=0}^{N-1} C'(f) * e^{j\frac{2\pi tf}{N}} \quad (24)$$

For example, the IFFT processing unit 1338 reads Equation (24) stored in the internal memory, and substitutes the interpolation signal C'(f) into Equation (24). Accordingly, the signal c(t) is obtained.

The EQ filter coefficient generation unit 133 outputs the signal c(t), which is obtained by conversion into the time-axis direction, as an EQ filter coefficient, to the EQ 121. The signal c(t) includes, for example, the phase at the center frequency of the transmission signal, and has inverse characteristics with respect to a CAL signal (furthermore, a transmission signal). Therefore, the EQ 121 is able to correct the phase of the transmission signal, based on the signal having the inverse characteristics.

Figure 14:
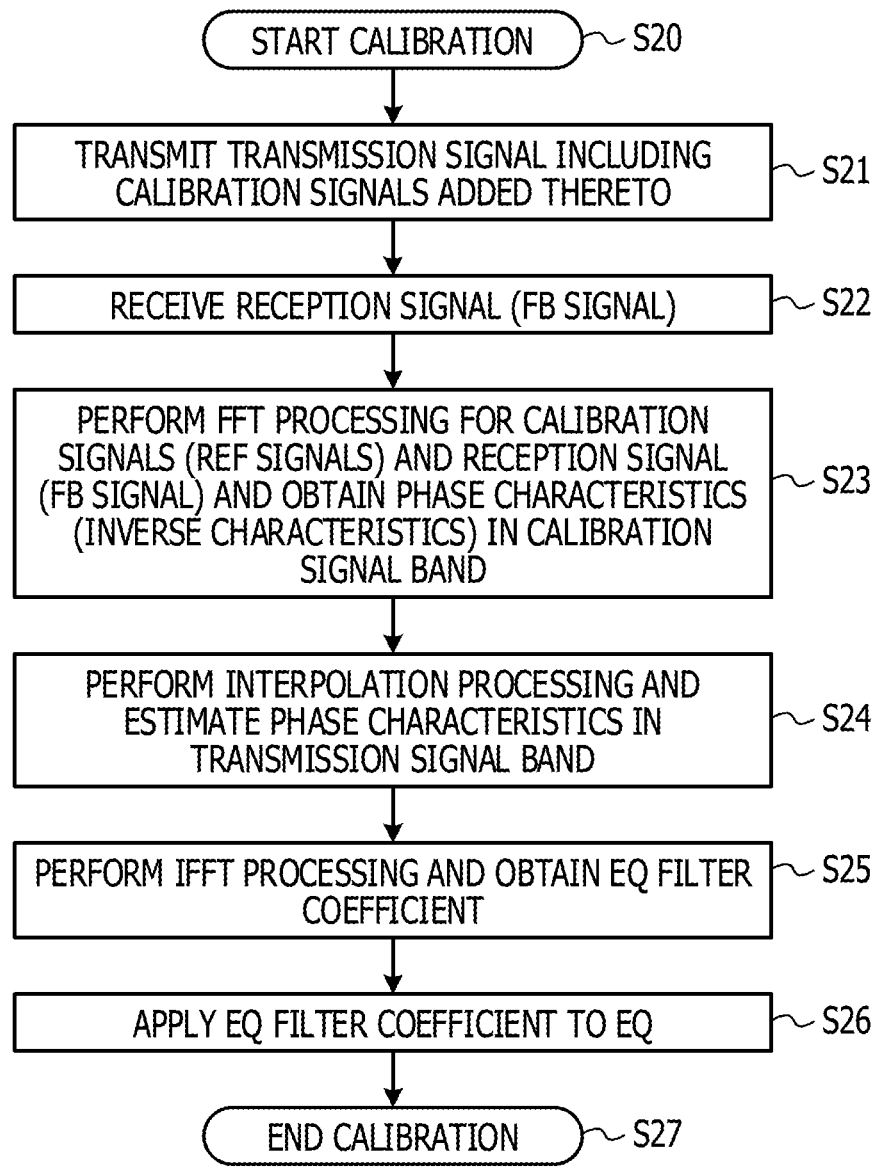
FIG. 14 is a flowchart illustrating an example of an operation in a base station apparatus.

FIG. 14 is a flowchart illustrating an example of an operation in the base station 100.

When starting calibration (S20), the base station 100 adds calibration signals to a transmission signal, transmits the transmission signal including the calibration signals, and obtains an FB signal (S21 and S22).

Next, the base station 100 performs FFT processing for REF signals and the FB signal, and calculates phase characteristics of inverse characteristics in the calibration signal band (S23). For example, the EQ filter coefficient generation unit 133 performs the processing described below. For example, the FFT processing unit 1335-1 performs FFT processing for the REF signals d(t), using Equation (20), and the FFT processing unit 1335-2 performs FFT processing for the FB signal x(t), using Equation (21). Then, the division processing unit 1336 divides the REF signals D(f) that has been subjected to the FFT processing by the FB signal x(t) that has been subjected to the FFT processing, using Equation (22), and obtains a signal C(f) having inverse characteristics.

Next, the base station 100 performs interpolation processing to estimate a phase within the band of the transmission signal (S24). For example, the interpolation processing unit 1337 performs interpolation processing such as linear interpolation based on the least-squares method for the signal C(f) having the inverse characteristics, using Equation (23), and estimates the phase of the signal C(f) in the frequency section (or the transmission signal band) including the center frequency of the transmission signal.

Next, the base station 100 performs IFFT processing to calculate the EQ filter coefficient c(t) (S25). For example, the IFFT processing unit 1338 performs inverse Fourier transform processing for the signal C'(f) that has been subjected to interpolation, using Equation (24), and obtains the EQ filter coefficient c(t).

Next, the base station 100 applies the EQ filter coefficient c(t) to the EQ 121 (S26).

Then, the base station 100 ends calibration (S27).

As described above, in the second embodiment, the base station 100 estimates a phase having inverse characteristics at the center frequency of a transmission signal, by division processing and interpolation processing, using a higher-frequency CAL signal and a lower-frequency CAL signal with the signal band of the transmission signal sandwiched therebetween (for example, S24 in FIG. 14). Therefore, as in the first embodiment, the base station 100 is able to estimate the phase at the center frequency of the transmission signal with high accuracy, using the higher-frequency CAL signal and the lower-frequency CAL signal with the center frequency of the transmission signal sandwiched therebetween. Thus, the base station 100 is able to increase the accuracy of calibration.

Furthermore, calibration is performed in the RRH 120. Therefore, a CAL signal is not fed back to the BBU 110 or an FB signal is not fed back to the BBU 110. Therefore, in the second embodiment, compared to the case where calibration is performed on the BBU 110 side, the base station 100 does not perform complicated processing.

Other Embodiments

In the first and second embodiments, examples in which calibration is performed in the base station 100 have been explained. For example, calibration may be performed in the terminal 200.

Figure 15:
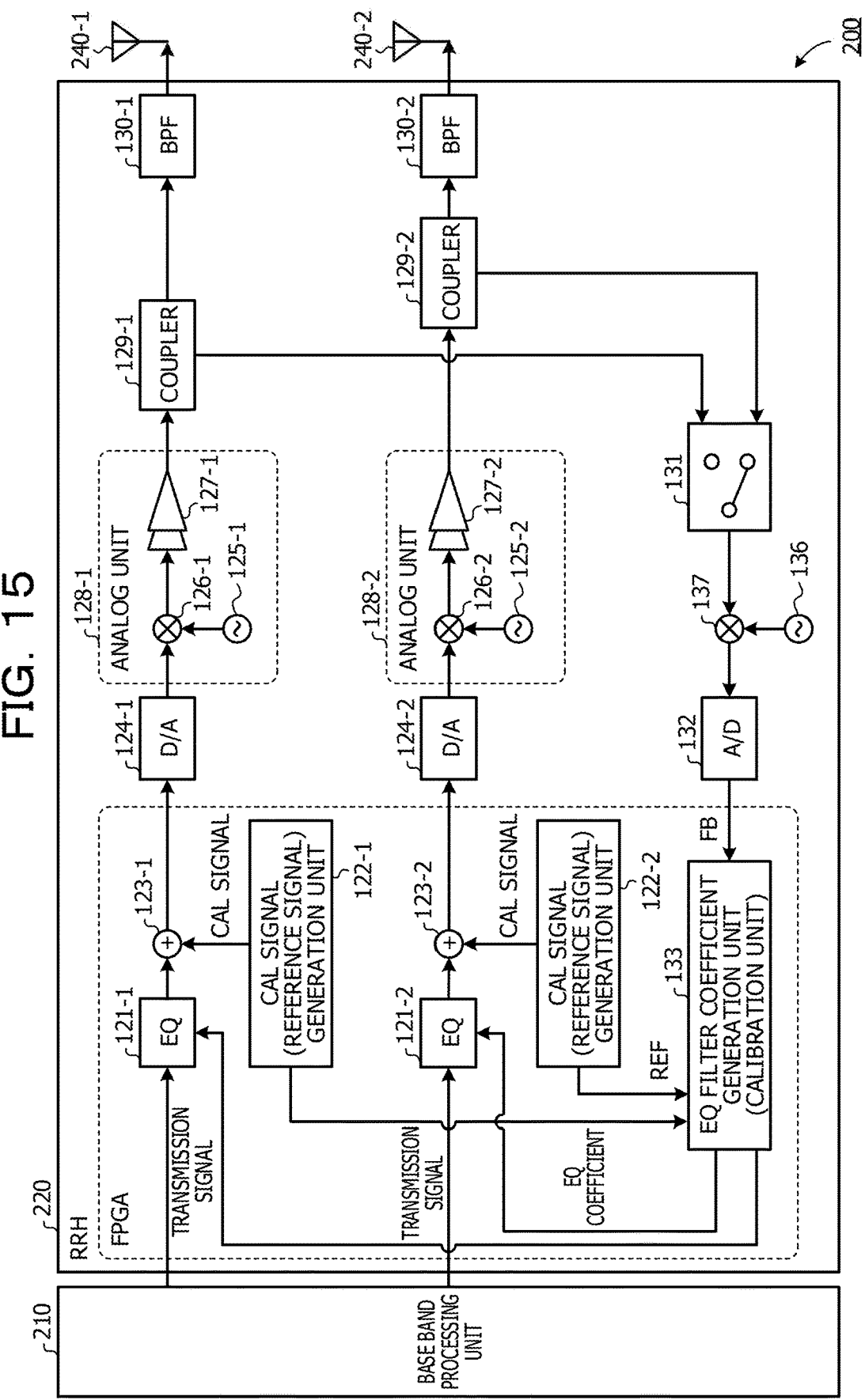
FIG. 15 illustrates an example of a configuration of a terminal apparatus.

FIG. 15 illustrates an example of a configuration of the terminal 200. Compared to the base station 100 illustrated in FIG. 2, the BBU 110 corresponds to a base band processing unit 210, and the RRH 120 corresponds to a radio processing unit 220.

The terminal 200 includes the CAL signal generation units 122-1 and 122-2. As in the first and second embodiments, the CAL signal generation units 122-1 and 122-2 generate a lower-frequency CAL signal and a higher-frequency CAL signal, respectively. In this case, the CAL signal generation units 122-1 and 122-2 may generate CAL signals having CW waves, as in the first embodiment, or may generate CAL signals having modulation waves, as in the second embodiment.

Furthermore, as with the base station 100, the EQ filter coefficient generation unit 133 calculates an EQ filter coefficient by estimating the phase at the center frequency of a transmission signal, based on REF signals and an FB signal.

Therefore, as in the first and second embodiments, the terminal 200 is able to increase the accuracy of calibration and reduce processing.

In the first and second embodiments, examples in which the CAL signal generation unit 122, the EQ filter coefficient generation unit 133, and the like are included in the RRH 120 have been explained. However, the CAL signal generation unit 122, the EQ filter coefficient generation unit 133, and the like are not necessarily included in the RRH 120 and may be included in any block other than the RRH 120 as long as the block performs processing regarding radio processing. An example of such a block is, for example, a radio processing unit, as in the terminal 200.

Figure 16:
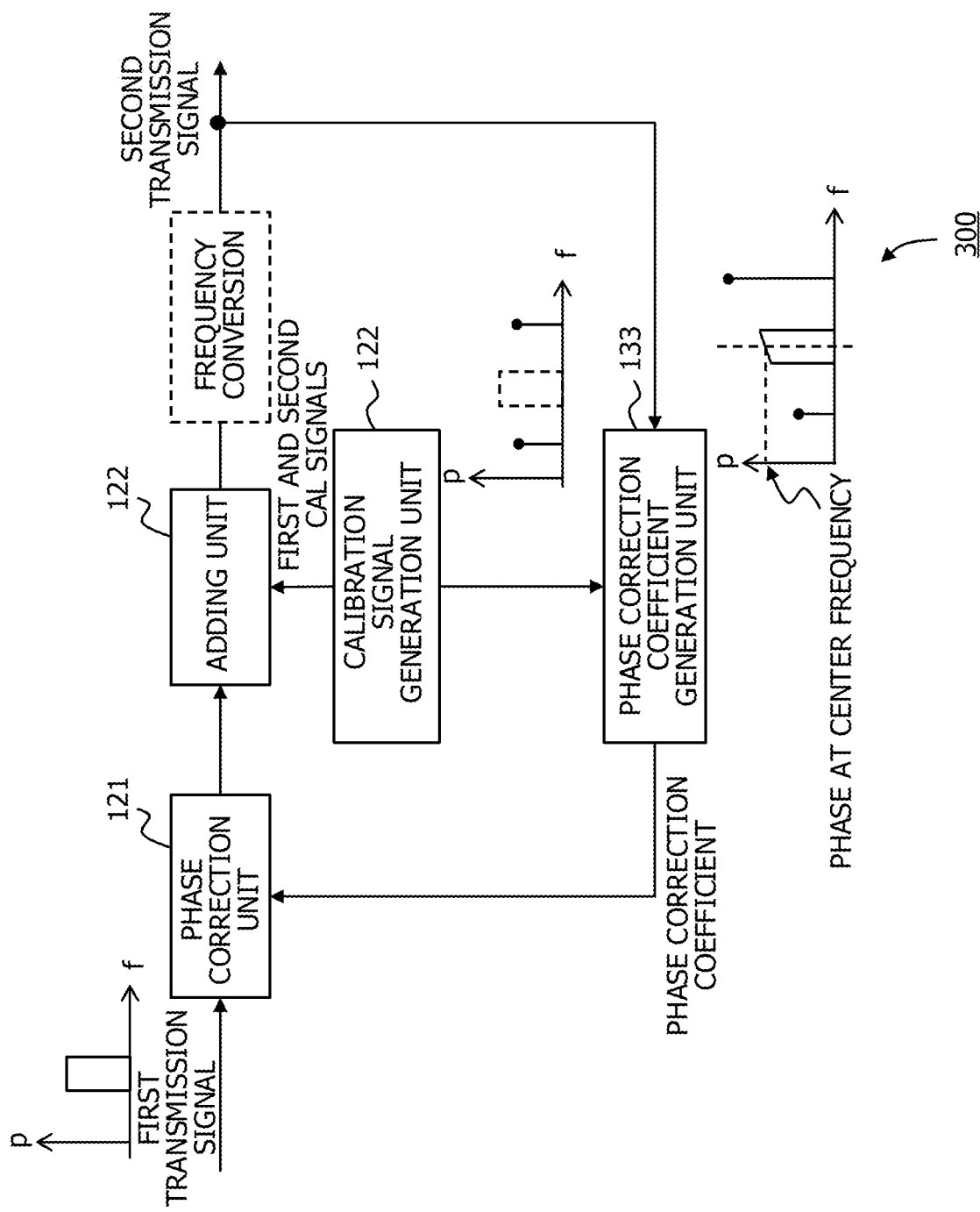
FIG. 16 illustrates an example of a configuration of a radio communication apparatus.

FIG. 16 illustrates an example of a configuration of a radio communication apparatus 300. The radio communication apparatus 300 corresponds to, for example, the base station 100 and the terminal 200. The radio communication apparatus 300 performs frequency conversion of a first transmission signal that has been modulated at a frequency in a specific frequency band to convert the first transmission signal into a second transmission signal having a frequency in a transmission frequency band, and transmits the resultant second transmissions signal.

The radio communication apparatus 300 includes a phase correction unit 121, an adding unit 122, a calibration signal generation unit 122, and a phase correction coefficient generation unit 133. The phase correction unit 121 corresponds to, for example, the EQ 121 in the first embodiment. The adding unit 122, the calibration signal generation unit 122, and the phase correction coefficient generation unit 133 correspond to, for example, the adding unit 122, the CAL signal generation unit 122, and the EQ filter coefficient generation unit 133, respectively.

The calibration signal generation unit 122 generates a first calibration signal outside a specific frequency band of a first transmission signal, the first calibration signal having a frequency higher than the highest frequency in the specific frequency band, and a second calibration signal outside the specific frequency band, the second calibration signal having a frequency lower than the lowest frequency in the specific frequency band. For example, the specific frequency band is a base band, and the transmission frequency band is a radio band (or an RF band).

The adding unit 122 adds the first and second calibration signals to the first transmission signal.

The phase correction coefficient generation unit 133 estimates the phase at the center frequency in the specific frequency band of the first transmission signal, based on the first and second calibration signals and the second transmission signal, and outputs a phase correction coefficient corresponding to the estimated phase.

The phase correction unit 121 corrects the phase of the first transmission signal, based on the phase correction coefficient.

As described above, the radio communication apparatus 300 estimates the phase at the center frequency of the first transmission signal, using the higher-frequency first calibration signal and the lower-frequency second calibration signal with the signal band of the first transmission signal sandwiched therebetween.

Therefore, the radio communication apparatus 300 is able to estimate the phase at the center frequency of the transmission signal with high accuracy, using the higher-frequency first calibration signal and the lower-frequency second calibration signal with the center frequency of the transmission signal sandwiched therebetween. Thus, the radio communication apparatus 300 is able to increase the accuracy of calibration.

Furthermore, in the radio communication apparatus 300, calibration is performed in a block that performs processing for the first transmission signal that has already been modulated at a frequency in a specific frequency band, instead of a block that performs processing in the base band. Therefore, the first and second calibration signals and the second transmission signal are not fed back to the block that performs processing in the base band. Thus, compared to the case where calibration is performed in the block that performs processing in the base band, the radio communication apparatus 300 is able to avoid complicated processing.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio communication apparatus configured to perform frequency conversion of a first transmission signal that has been modulated at a frequency in a specific frequency band to convert the first transmission signal into a second transmission signal having a frequency in a transmission frequency band and transmit the second transmission signal, the radio communication apparatus comprising:
    a calibration signal generation circuit configured to generate a first calibration signal outside the specific frequency band, the first calibration signal having a frequency higher than a highest frequency in the specific frequency band, and a second calibration signal outside the specific frequency band, the second calibration signal having a frequency lower than a lowest frequency of the specific frequency band;
    an adding circuit configured to add the first and second calibration signals to the first transmission signal;
    a phase correction coefficient generation circuit configured to estimate a phase at a center frequency in the specific frequency band of the first transmission signal, based on the first and second calibration signals and the second transmission signal, and output a phase correction coefficient corresponding to the estimated phase; and
    a phase correction circuit configured to correct the phase of the first transmission signal, based on the phase correction coefficient.

2. The radio communication apparatus according to claim 1,
    wherein the calibration signal generation circuit is configured to generate the first calibration signal having a first frequency higher than the highest frequency of the specific frequency band and the second calibration signal having a second frequency lower than the lowest frequency of the specific frequency band.

3. The radio communication apparatus according to claim 2,
    wherein the calibration signal generation circuit is configured to generate the first and second calibration signals, a third calibration signal having a third frequency higher than the highest frequency of the specific frequency band, and a fourth calibration signal having a fourth frequency lower than the lowest frequency of the specific frequency band.

4. The radio communication apparatus according to claim 3,
    wherein the phase correction coefficient generation circuit is configured to
    calculate, based on first to fourth correlation calculation results obtained by correlation calculation of the first to fourth calibration signals and the second transmission signal, a gradient indicating a phase difference with respect to a frequency difference between the first correlation calculation result and the second correlation calculation result, and
    estimate the phase at the center frequency in the specific frequency band of the first transmission signal, based on the gradient.

5. The radio communication apparatus according to claim 1, wherein the calibration signal generation circuit is configured to generate the first calibration signal having multiple frequencies included in a frequency band higher than the specific frequency band and the second calibration signal having multiple frequencies included in a frequency band lower than the specific frequency band.

6. The radio communication apparatus according to claim 5,
    wherein the phase correction coefficient generation circuit is configured to
    convert, by fast Fourier transform processing, the first and second calibration signals and the second transmission signal in a time axis direction into the first and second calibration signals and the second transmission signal in a frequency axis direction,
    generate a first signal by dividing the converted first and second calibration signals by the converted second transmission signal,
    interpolate phase of the first signal in a frequency section including the center frequency in the specific frequency band of the first transmission signal to generate a second signal, and
    convert, by inverse Fourier transform processing, the second signal into a signal in the time axis direction to generate the phase correction coefficient.

7. An antenna calibration method performed by a radio communication apparatus configured to perform frequency conversion of a first transmission signal that has been modulated at a frequency in a specific frequency band to convert the first transmission signal into a second transmission signal having a frequency in a transmission frequency band and transmit the second transmission signal, the antenna calibration method comprising:
    by a calibration signal generation circuit, generating a first calibration signal outside the specific frequency band, the first calibration signal having a frequency higher than a highest frequency in the specific frequency band, and a second calibration signal outside the specific frequency band, the second calibration signal having a frequency lower than a lowest frequency of the specific frequency band;
    by an adding circuit, adding the first and second calibration signals to the first transmission signal;
    by a phase correction coefficient generation circuit, estimating a phase at a center frequency in the specific frequency band of the first transmission signal, based on the first and second calibration signals and the second transmission signal, and outputting a phase correction coefficient corresponding to the estimated phase; and by a phase correction circuit, correcting the phase of the first transmission signal, based on the phase correction coefficient.

* * * * *